United States Patent
Bhuptani et al.

(10) Patent No.: US 11,488,140 B2
(45) Date of Patent: Nov. 1, 2022

(54) METHOD AND SYSTEM FOR PROVIDING MOBILE TICKETING TO USERS

(71) Applicant: ANI Technologies Private Limited, Karnataka (IN)

(72) Inventors: Brijraj Saroj Bhuptani, Mumbai (IN); Danish Ahmed Ansari, Mumbai (IN); Adnan Haris Shahid Mahmood, Malegaon (IN); Bosco DSouza, Mumbai (IN)

(73) Assignee: ANI Technologies Private Limited, Bengaluru (IN)

(*) Notice: Subject to any disclaimer, the term of this patent is extended or adjusted under 35 U.S.C. 154(b) by 491 days.

(21) Appl. No.: 16/716,944

(22) Filed: Dec. 17, 2019

(65) Prior Publication Data

US 2021/0027273 A1     Jan. 28, 2021

(30) Foreign Application Priority Data

Jul. 22, 2019 (IN) .............................. 201941029615

(51) Int. Cl.
*G06Q 20/32* (2012.01)
*G07C 9/00* (2020.01)
*G06Q 10/02* (2012.01)
*H04W 4/80* (2018.01)

(52) U.S. Cl.
CPC ......... *G06Q 20/3274* (2013.01); *G06Q 10/02* (2013.01); *G06Q 20/3224* (2013.01); *G06Q 20/3278* (2013.01); *G07C 9/00817* (2013.01); *H04W 4/80* (2018.02); *G07C 2009/00841* (2013.01)

(58) Field of Classification Search
None
See application file for complete search history.

(56) References Cited

U.S. PATENT DOCUMENTS

| | | | |
|---|---|---|---|
| 9,881,433 B2 | 1/2018 | Bergdale et al. | |
| 10,915,906 B2* | 2/2021 | Keith | G06Q 20/306 |
| 11,212,105 B2* | 12/2021 | Young | H04L 9/3234 |
| 2015/0084741 A1 | 3/2015 | Bergdale et al. | |
| 2017/0301160 A1* | 10/2017 | Somani | G07B 15/00 |
| 2017/0316423 A1 | 11/2017 | Inderst et al. | |
| 2019/0058591 A1* | 2/2019 | Sharpe | H04L 9/3234 |

FOREIGN PATENT DOCUMENTS

| | | |
|---|---|---|
| CN | 105405170 A | 3/2016 |
| CN | 106097459 A | 11/2016 |
| CN | 107516210 A | 12/2017 |

* cited by examiner

*Primary Examiner* — Saba Tsegaye
(74) *Attorney, Agent, or Firm* — Chip Law Group

(57) ABSTRACT

A mobile ticketing method and system for providing mobile ticketing services to users is provided. A user selects a mobile ticket and initiates payment by using a user device. In response to successful processing of the payment, the user device receives encrypted QR data from a server. The user device decrypts and format the encrypted QR data to display a QR code. The QR code is scanned at a gate terminal associated with an entry or exit gate. The gate terminal validates the QR code and broadcasts data pertaining to the QR code via a BLE network. The user device verifies the gate terminal on receiving the broadcasted data via the BLE network, and transmits a connection request to the gate terminal. The gate terminal further validates the connection request and decides whether to allow or disallow the user to pass through the entry or exit gate.

20 Claims, 12 Drawing Sheets

METHOD AND SYSTEM FOR PROVIDING MOBILE TICKETING TO USERS

CROSS-RELATED APPLICATIONS

This application claims priority of Indian Application Serial No. 201941029615, filed Jul. 22, 2019, the contents of which are incorporated herein by reference.

FIELD

Various embodiments of the disclosure relate generally to mobile ticketing. More specifically, various embodiments of the disclosure relate to a method and system for providing mobile ticketing to users.

BACKGROUND

Traditional ticketing methods like paper ticketing and smart cards utilize a lot of operational cost, financial leakage, waste of consumer's time, and restricted ease of use. As the world is moving towards the digital age, the mass population is connected using smart phones. With the popularity of the smart phones and application of mobile internet technology, mobile payment has penetrated every aspect of consumer's lives. Further, the increasing availability of broadband cellular networks and Internet hotspots and the growing proliferation of sophisticated mobile devices with increased computer power and improved features and capabilities have enabled the mobile devices to both receive and redeem mobile tickets. Mobile tickets are intended to be less susceptible to fraud or illegal resale. However, though these advances in telecommunications have lowered the start-up costs of establishing mobile ticketing systems, they have also presented significant security challenge for the mobile vendors. If unauthorized mobile devices are able to redeem mobile tickets, the value of the mobile ticketing industry will severely diminished due to lack of confidence in the security of the mobile tickets purchased by consumers.

For efficient mobile ticketing, various solutions have been introduced in the prior art to cope up with the problems stated above. Known solutions for mobile ticketing utilize a quick response (QR) scanner, proximity sensors, and near-field communication (NFC). Some issues that have arisen in the adoption of mobile ticketing are lack of infrastructure and availability of NFC-enabled mobile devices. Since many devices do not configure this feature, the lack of application of basic terminal and technical standards are not uniform. Also, the NFC still has not yet reached the large-scale promotion and popularization among the consumers. QR scanners are being widely used for mobile ticketing applications. The current mobile ticketing systems with QR scanning communicate with online servers to validate a QR code. However, this may result in delay in the validation of the QR code due to server calls and processing, leading to bad consumer experience.

To overcome the above problems, the QR scanners with proximity sensors have been introduced. The QR scanners with proximity sensors as peripheral accessories require added infrastructural cost to the existing solutions. Further, the processing time will be increased as there would be multiple calculations involving the proximity sensors and the server processing, which will increase the time needed to validate the QR code.

In light of the foregoing, there exists a need for a technical and reliable solution that takes into consideration the above-mentioned problems, challenges, and short-comings, and facilitates effective and efficient mobile ticketing solutions to consumers.

SUMMARY

A method and system for providing mobile ticketing to users is provided substantially as shown in, and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
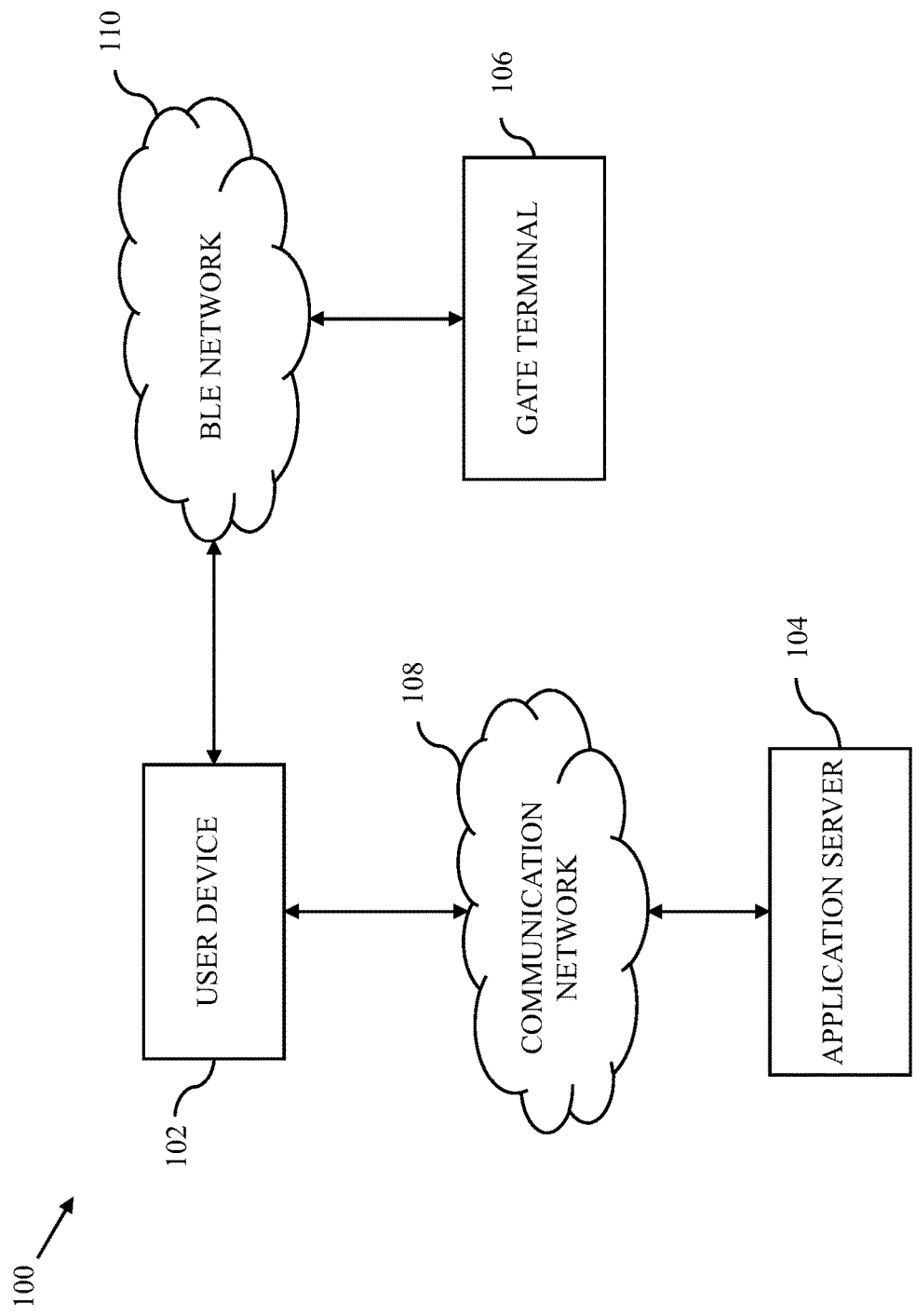
FIG. 1 is a block diagram that illustrates a system environment for mobile ticketing, in accordance with an exemplary embodiment of the disclosure.

Certain embodiments of the disclosure may be found in a disclosed apparatus for providing mobile ticketing to users. Exemplary aspects of the disclosure include a method and system for providing mobile ticketing to users. The mobile ticketing method includes one or more operations that are executed by one or more components of the mobile ticketing system to provide mobile ticketing services to the users in an online manner. The one or more components may include at least a server, a user device, and a gate terminal. The gate terminal may be associated with an entry or exit gate. In an embodiment, the entry or exit gate may be associated with a platform of a paid area such as a metro, bus, airport, or railway platform having restricted entry or exit. In another embodiment, the entry or exit gate may be associated with an event such as a public or corporate event having restricted entry or exit. In another embodiment, the entry or exit gate may be associated with a mode of transport such as a cab, bus, train, or airplane. In some embodiments, the same gate may be used as the entry gate as well as the exit gate.

In an embodiment, the server may be configured to receive a payment request from the user device via a first communication network. The payment request may be received based on selection of the mobile ticket by a user of the user device. The selection of the mobile ticket may be performed by the user by using a mobile ticketing application running on the user device. The server may be further configured to generate an encrypted quick response (QR) data based on successful processing of the payment request. The server may be further configured to transmit the encrypted QR data to the user device via the first communication network.

In an embodiment, the user device may be configured to receive the encrypted QR data from the server via the first communication network. The user device may be further configured to decrypt the encrypted QR data, and format the decrypted QR data to display as a QR code. When the QR code is opened by the user, the user device may initiate a scan for the gate terminal via a Bluetooth Low Energy (BLE) network.

In an embodiment, the gate terminal may include a QR scanner that is configured to scan the QR code from the user device. The gate terminal may be further configured to validate the scanned QR code to determine a successful validation or an unsuccessful validation of the scanned QR code. Based on the validation of the scanned QR code, the gate terminal may be further configured to transmit encrypted data pertaining to the scanned QR code to the user device via the BLE network.

In an embodiment, the user device may be further configured to receive the encrypted data from the gate terminal. The user device may be further configured to decrypt the encrypted data, and verify the decrypted data for current transaction specific information. The decrypted data may include ticketing information associated with the mobile ticket. The user device may be further configured to present a user interface to display the ticketing information associated with the mobile ticket. The ticketing information may include at least validity information indicative of a positive outcome or one of negative outcomes. The negative outcomes may include information such as, but are not limited to, over-travel or over-time information. The user device may be further configured to transmit a connection request to the gate terminal based on the verification of the decrypted data.

In an embodiment, the gate terminal may be further configured to receive the connection request from the user device. Further, the gate scanner may be configured to validate the connection request based on a distance of the user device from the gate terminal. The gate terminal may be further configured to allow or disallow the user to pass through the entry or exit gate based on at least one of the validation of the scanned QR code, the validation of the connection request, or a specified time period associated with the mobile ticket. For example, based on the successful validation of the scanned QR code, the gate terminal may allow the user to pass through the entry or exit gate within the specified time period, when the connection request is successfully validated. In another example, the gate terminal may disallow the user to pass through the entry or exit gate based on at least one of the unsuccessful validation of the scanned QR code or a timeout of the specified time period.

In an embodiment, the gate terminal may be further configured to generate a first signal when the user is allowed to pass through the entry or exit gate, or a second signal when the user is disallowed to pass through the entry or exit gate. The first signal may be different from the second signal. Further, the first signal and the second signal may be based on at least one of a color-based signal, an audio-based signal, or a text-based signal. In an embodiment, the gate terminal may be further configured to transmit an acknowledgment message to the user device based on successful validation of the scanned QR code. The acknowledgment message may be transmitted to void the QR code.

Thus, for providing the mobile ticketing services to the users in an online manner, the complete process requires the server to generate the mobile ticket or pass, post which the remaining processes are handled between the user device and the gate terminal providing a seamless, secure, and fast experience along with ensuring zero fraud due to the tight integration between QR Scanner and BLE.

FIG. 1 is a block diagram that illustrates a system environment 100 for mobile ticketing, in accordance with an exemplary embodiment of the disclosure. The system environment 100 includes a user device 102, an application server 104, and a gate terminal 106. In an embodiment, the user device 102 and the application server 104 may be coupled to each other via a communication network 108, and the user device 102 and the gate terminal 106 may be coupled to each other via a Bluetooth Low Energy (BLE) network 110.

The user device 102 may include suitable logic, circuitry, interfaces, and/or code, executable by the circuitry, that may be configured to perform one or more operations. The one or more operations may be facilitated by a mobile ticketing application running on the user device 102. For example, the mobile ticketing application may be used, by a user of the user device 102, to select a mobile ticket from a set of mobile ticket types offered by an online mobile ticket service provider. In one example, the mobile ticket may be selected for entering into (and/or exiting from) a paid area associated with a metro, a bus, a railway, or an airport. In another example, the mobile ticket may be selected for entering into (and/or exiting from) a paid area associated with a public or private event such as a music event, a sports event, a political event, or the like. In another example, the mobile ticket may be selected for entering into a paid vehicle for a ride, and/or exiting from the paid vehicle after the ride. In some embodiments, the same gate may be used as the entry gate as well as the exit gate.

In an embodiment, the user device 102 may be configured to run the mobile ticketing application, hosted by the application server 104, for presenting various user-selectable options associated with the selection and purchase of the mobile ticket by the user. The user-selectable options may include one or more options that are selected by the user to provide preferences associated with the mobile ticket. For example, the one or more options may correspond to at least one of an entry time period, an exit time period, a ticket validity period, an entry location, an exit location, a ticket type, a number of tickets, a ticket price, or the like. Based on the selection of the one or more options by the user, the mobile ticket (as required by the user) is presented on the user device 102 by the application server 104.

In an embodiment, based on a confirmation of the selected mobile ticket by the user, the user device 102 may be configured to transmit a payment request to the application server 104 via the communication network 108. In an embodiment, based on successful processing of the payment request by the application server 104, the user device 102 may be further configured to receive encrypted quick response (QR) data from the application server 104 via the communication network 108. The encrypted QR data may include an encrypted QR code having a unique reference number associated with the purchase of the mobile ticket. The encrypted QR data may also include encrypted mobile ticketing information associated with at least one of an entry time period, an exit time period, a ticket validity period, an entry location, an exit location, a ticket type, a number of tickets, a ticket price, user details, transaction details, or the like.

In an embodiment, the user device 102 may be further configured to decrypt the encrypted QR data and format the decrypted QR data to display as a QR code. The user device 102 may be further configured to initiate a scan for the gate terminal 106. In an embodiment, the user device 102 may scan for the gate terminal 106 based on the QR code. For example, the user device 102 may initiate the scan for the gate terminal 106 in response to the user opening the QR code on the user device 102. In an embodiment, the user device 102 may scan for the gate terminal 106 via the BLE network 110.

In an embodiment, after scanning of the gate terminal 106, the user device 102 may be used by the user to present the QR code to a QR scanner associated with the gate terminal 106 for scanning the QR code. The user device 102 may be further configured to receive encrypted data pertaining to the scanned QR code from the gate terminal 106 via the BLE network 110. The encrypted data may be received based on validation of the QR code by the gate terminal 106. The user device 102 may be further configured to decrypt the encrypted data and verify the decrypted data. In an embodiment, the user device 102 may verify the decrypted data by comparing the decrypted data with the mobile ticketing information of the mobile ticket. For example, the user device 102 may verify the decrypted data by comparing the transaction details of the decrypted data with the transaction details of the mobile ticket purchased by the user. In an embodiment, the user device 102 may be further configured to transmit a connection request to the gate terminal 106 via the BLE network 110. The connection request may be transmitted based on the verification of the decrypted data. In an embodiment, the user device 102 may be further configured to render a validity display user interface to display the ticket validity information associated with the mobile ticket based on the validation of the QR code by the gate terminal 106. The ticket validity information may include at least validity information indicative of a positive outcome or one of negative outcomes. The negative outcomes may include information such as, but are not limited to, over-travel, over-time, or ticket expiration information. Various operations of the user device 102 have been described in detail in conjunction with FIGS. 2, 5A-5C, 6A-6B, and 7.

Various modes of the input that may be used by the user for selecting the mobile ticket or for performing other related operations may include, but are not limited to, a touch-based input, a text-based input, a voice-based input, a gesture-based input, or any combination thereof. Examples of the user device 102 may include, but are not limited to, a personal computer, a laptop, a smartphone, and a tablet computer.

The application server 104 may include suitable logic, circuitry, interfaces, and/or code, executable by the circuitry, that may be configured to perform one or more operations for generating one or more mobile tickets and processing one or more payment requests corresponding to the one or more mobile tickets. The application server 104 may be a computing device, which may include a software framework, that may be configured to create the application server implementation and perform the various operations associated with the generation of the one or more mobile tickets and the processing of the one or more payment requests. The application server 104 may be realized through various web-based technologies, such as, but are not limited to, a Java web-framework, a .NET framework, a professional hypertext preprocessor (PHP) framework, a python framework, or any other web-application framework. The application server 104 may also be realized as a machine-learning model that implements any suitable machine-learning techniques, statistical techniques, or probabilistic techniques. Examples of such techniques may include expert systems, fuzzy logic, support vector machines (SVM), Hidden Markov models (HMMs), greedy search algorithms, rule-based systems, Bayesian models (e.g., Bayesian networks), neural networks, decision tree learning methods, other non-linear training techniques, data fusion, utility-based analytical systems, or the like. Examples of the application server 104 may include, but are not limited to, a personal computer, a laptop, a mini-computer, a mainframe computer, a cloud-based server, a network of computer systems, or a non-transient and tangible machine executing a machine-readable code.

In an embodiment, the application server 104 may be configured to host the mobile ticketing application on the user device 102, and facilitates one or more online services associated with the mobile ticketing via the communication network 108. For example, when the user opens the mobile ticketing application on the user device 102 that is coupled to the application server 104 via the communication network 108, the application server 104 may be configured to render a service application user interface on the user device 102 via the mobile ticketing application running on the user device 102. The service application user interface may present various user-selectable options associated with the selection and purchase of the mobile ticket by the user. The user-selectable options may include one or more options that are selected by the user to provide preferences associated with the mobile ticket. The one or more options may correspond to at least one of an entry time period, an exit time period, a ticket validity period, an entry location, an exit location, a ticket type, a number of tickets, a ticket price, or the like. In one example, in the case of a metro, bus, or cab ride, the user may select options corresponding to at least an entry location and an exit location. Additionally, the user may select an option corresponding to a ticket type (such as a general ticket or a VIP ticket), if applicable. The application server 104 may be configured to receive the selected options from the user device 102. Based on the selected options by the user, the application server 104 may be configured to generate the mobile ticket. The application server 104 may be further configured to present the mobile ticket and the ticket price on the service application user interface rendered on the user device 102. The mobile ticket may be presented to allow the user to review and confirm the mobile ticket based on the ticket price and other ticket-related details. Based on the confirmation of the mobile ticket by the user, the application server 104 may be configured to render a payment user interface on the user device 102 via the mobile ticketing application running on the user device 102. The payment user interface may present various user-selectable payment options for initiating the payment request corresponding to the mobile ticket. The various user-selectable payment options may include a net-banking-based payment option, a card-based payment option, a wallet-based payment option, or the like. Based on the selection of one of the various user-selectable payment options and entry of the requisite details for the payment by the user, the user device 102 (in conjunction with the mobile ticketing application) may transmit the payment request to the application server 104 via the communication network 108.

In an embodiment, the application server 104 may be configured to receive the payment request from the user device 102 via the communication network 108. The application server 104 may be further configured to process the payment request. The application server 104 may be further configured to generate the QR data based on the successful processing of the payment request. The QR data may include a QR code having a unique reference number associated with the purchase of the mobile ticket. The QR data may also include mobile ticketing information associated with at least one of an entry time period, an exit time period, a ticket validity period, an entry location, an exit location, a ticket type, a number of tickets, a ticket price, user details, transaction details, or the like. Further, the application server 104 may be configured to encrypt the generated QR data to obtain the encrypted QR data. The generated QR data may be encrypted by using one or more encryption techniques based on Advanced Encryption Standard (AES), Triple Data Encryption Standard (3DES), Twofish, or the like. Upon generation of the encrypted QR data, the application server 104 may be configured to transmit the encrypted QR data to the user device 102 via the communication network 108. Various operations of the application server 104 have been described in detail in conjunction with FIGS. 3, 5A-5C, and 6A-6B.

The gate terminal 106 may include suitable logic, circuitry, interfaces, and/or code, executable by the circuitry, that may be configured to perform one or more operations associated with an entry or exit gate of a paid area or a vehicle. The gate terminal 106 may be a computing device, which may include a software framework, that may be configured to create the gate terminal implementation with the entry or exit gate and perform the one or more operations associated with the entry or exit gate. Examples of the gate terminal 106 may include, but are not limited to, a personal computer, a laptop, a mini-computer, a mainframe computer, a cloud-based server, a network of computer systems, or a non-transient and tangible machine executing a machine-readable code.

In an embodiment, the gate terminal 106 may be configured to process, control, and manage various functionalities and operations associated with providing the restricted entry or exit to the user. In an embodiment, the gate terminal 106 may be configured to scan the QR code from the user device 102 by using the QR scanner. In an exemplary scenario, the user device 102 displaying the QR code may be held by the user in front of the QR scanner for scanning the QR code from the user device 102. Upon scanning of the QR code, the gate terminal 106 may be configured to validate the scanned QR code by executing a validation process. Based on the execution of the validation process, the gate terminal 106 may be further configured to determine a successful validation or an unsuccessful validation of the scanned QR code. The gate terminal 106 may be further configured to generate encrypted data pertaining to the scanned QR code. The encrypted data may be generated based on an outcome of the validation process.

In an embodiment, the gate terminal 106 may be further configured to transmit the encrypted data to the user device 102 based on the validation of the scanned QR code. The gate terminal 106 may be configured to monitor BLE connections such as the BLE network 110 and transmit BLE data packets including the encrypted data. The encrypted data may include encrypted ticket validity information associated with the mobile ticket. The ticket validity information may include at least validity information indicative of the positive outcome or one of the negative outcomes. The negative outcomes may include information such as, but are not limited to, the over-travel, over-time, or ticket expiration information. The encrypted data may also include encrypted mobile ticketing information associated with the mobile ticket.

In an embodiment, the gate terminal 106 may be further configured to monitor for BLE connections. For example, the gate terminal 106 may be configured to receive the connection request from the user device 102 via the BLE network 110. The gate terminal 106 may be further configured to validate the connection request. The gate terminal 106 may validate the connection request to determine a successful or unsuccessful validation of the connection request.

In an embodiment, the gate terminal 106 may be further configured to allow the user to pass through the entry or exit gate. The user may be allowed to pass through the entry or exit gate within a specified time period (for example, an entry time period or a ticket validity period) based on the successful validation of the scanned QR code, when the connection request is successfully validated. For example, the gate terminal 106 may trigger opening of the entry or exit gate to allow the user to pass through. The gate terminal 106 may be further configured to generate a first signal when the user is allowed to pass through the entry or exit gate. The first signal may be generated based on at least one of a color-based signal, an audio-based signal, or a text-based signal.

In some embodiments, the gate terminal 106 may be configured to disallow the user to pass through the entry or exit gate. The user may be disallowed to pass through the entry or exit gate based on the unsuccessful validation of the scanned QR code or a timeout of the specified time period. For example, the gate terminal 106 may not initiate the opening of the entry or exit gate, thereby disallowing the user to pass through. The gate terminal 106 may be further configured to generate a second signal when the user is disallowed to pass through the entry or exit gate. The second signal may be generated based on at least one of a color-based signal, an audio-based signal, or a text-based signal. In an embodiment, the first signal and the second signal are different from each other.

In an embodiment, the gate terminal 106 may be further configured to transmit an acknowledgment message to the user device 102 based on the successful validation of the scanned QR code. The acknowledgment message may be transmitted to void the QR code. Voiding of the QR code may prevent duplicate usage of the mobile ticket by other users. Various operations of the gate terminal 106 have been described in detail in conjunction with FIGS. 4, 5A-5C, 6A-6B, and 8.

The communication network 108 may include suitable logic, circuitry, interfaces, and/or code, executable by the circuitry, that may be configured to transmit queries, messages, data, and requests between various entities, such as the user device 102 and/or the application server 104. Examples of the communication network 108 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and any combination thereof. Various entities in the system environment 100 may be coupled to the communication network 108 in accordance with various wired and wireless communication protocols, such as Transmission Control Protocol and Internet Protocol (TCP/IP), User Datagram Protocol (UDP), Long Term Evolution (LTE) communication protocols, or any combination thereof.

The BLE network 110 may include suitable logic, circuitry, interfaces, and/or code, executable by the circuitry, that may be configured to transmit queries, messages, data, and requests between various entities, such as the user device 102 and/or the gate terminal 106. BLE networking enables detection and connection among devices (such as the user device 102 and the gate terminal 106). These devices generally do not require continuous connection therebetween in order for an exchange of information in the form of queries, messages, data, and requests to occur. These devices themselves vary in their construction, whether, for example, a sensor, a cellphone, a network access point (AP), or some other object configured to enable and/or provide BLE communication(s) and which is either stationary or mobile, such as a Bluetooth tag. In the context of BLE networking, such devices are prescribed by the Bluetooth Core Specification 4.0, Bluetooth Core Specification 4.1, Bluetooth Core Specification 4.2, and Bluetooth Core Specification 5.0, and are compatible with IEEE 802.15.1, as appropriate.

In operation, the mobile ticketing application running on the user device 102 may be used by the user to input one or more preferences for selecting and purchasing the mobile ticket. For example, the service application user interface (rendered on the user device 102 by the application server 104) may be used by the user to select the one or more options corresponding to the preferred mobile ticket. The one or more options may correspond to at least one of an entry time period, an exit time period, a ticket validity period, an entry location, an exit location, a ticket type, a number of tickets, a ticket price, or the like. Based on the selected options by the user, the user device 102 may be configured to transmit the selected options to the application server 104. The application server 104 may be configured to receive the selected options from the user device 102 and generate the mobile ticket for the user. The application server 104 may be further configured to present the mobile ticket and the ticket price on the service application user interface. The mobile ticket and the ticket price presented on the service application user interface may be reviewed by the user. When the mobile ticket is confirmed by the user, the user device 102 may be configured to transmit a confirmation notification to the application server 104. In response to the conformation notification, the application server 104 may be configured to render the payment user interface on the user device 102. The payment user interface may be used by the user to select one of the various user-selectable payment options. The payment user interface may be further used by the user to enter the requisite details for the payment. Based on the selection of one of the various user-selectable payment options and entry of the requisite details for the payment, the user device 102 (in conjunction with the mobile ticketing application) may be configured to transmit the payment request to the application server 104.

In an embodiment, the application server 104 may be configured to receive the payment request from the user device 102. Further, the application server 104 may be configured to process the payment request. The application server 104 may be further configured to generate the encrypted QR data including the encrypted mobile ticketing information associated with at least one of an entry time period, an exit time period, a ticket validity period, an entry location, an exit location, a ticket type, a number of tickets, a ticket price, user details, transaction details, or the like. In an embodiment, the encrypted QR data may be generated based on the successful processing of the payment request. The application server 104 may be further configured to transmit the encrypted QR data to the user device 102.

In an embodiment, the user device 102 may be configured to receive the encrypted QR data from the application server 104. The user device 102 may be further configured to decrypt the encrypted QR data and format the decrypted QR data to display as the QR code. The user device 102 may be further configured to initiate a scan for one or more relevant gate terminals such as the gate terminal 106. The gate terminal 106 may be automatically scanned or identified based on the opening of the QR code by the user on the user device 102. In an embodiment, the user device 102 may scan the gate terminal 106 via the BLE network 110. As it is known in the context of BLE communications, one or more devices assume the roles of a central and a peripheral. Here, the user device 102 is configured as a central device, and the gate terminal 106 is configured as a peripheral device. The peripheral device is generally understood as a device which merely broadcasts, or advertises, its presence toward another device referred to as the central device, with the intent that such presence be detected by that central device. The broadcast generally takes the form of a beacon advertisement message transmitted as a radio frequency (RF) signal. When the detection occurs, it is also generally understood that it is the central device that determines whether a connection with the peripheral device should occur or not. If the answer to that determination is in the affirmative, the central device establishes a connection with the peripheral device.

Upon scanning of the gate terminal 106 by the user device 102 via the BLE network 110, the user device 102 may be used by the user to present or display the QR code to the QR scanner for initiating a QR scanning process. Based on the execution of the QR scanning process, the QR scanner associated with the gate terminal 106 may scan the QR code from the user device 102, and retrieve the mobile ticketing information associated with the QR code. The gate terminal 106 may be further configured to execute the validation process to validate the scanned QR code. The scanned QR code may be validated based on the mobile ticketing information (such as an entry time period, an exit time period, a ticket validity period, an entry location, an exit location, a ticket type, a number of tickets, a ticket price, user details, transaction details, or the like). The scanned QR code may be validated to determine the successful validation or the unsuccessful validation of the scanned QR code. The successful validation of the scanned QR code may indicate a non-expired QR code corresponding to the mobile ticket issued to the user of the user device 102. The unsuccessful validation of the scanned QR code may indicate a non-expired QR code issued to some other user, or an expired QR code. In one example, the expired QR code may correspond to a previously-used mobile ticket availed by some other user. In another example, the expired QR code may correspond to the mobile ticket issued to the user of the user device 102, but the QR code has expired due to the timeout of the specified time period associated with the mobile ticket.

In an embodiment, the gate terminal 106 may be further configured to monitor for the BLE connections such as the BLE network 110 with the user device 102. In an embodiment, the gate terminal 106 may be further configured to generate the encrypted data pertaining to the scanned QR code and broadcast the encrypted data to the user device 102 via the BLE network 110, based on the validation of the scanned QR code.

In an embodiment, the user device 102 may be configured to receive the encrypted data from the gate terminal 106 via the BLE network 110. The user device 102 may be further configured to decrypt the encrypted data to obtain the decrypted data (such as the ticket validity information and/or mobile ticketing information associated with the mobile ticket), and verify the decrypted data. In one example, the user device 102 may verify the decrypted data based on the mobile ticketing information (such as an entry time period, an exit time period, a ticket validity period, an entry location, an exit location, a ticket type, a number of tickets, a ticket price, user details, transaction details, or the like). In one specific example, the user device 102 may verify the decrypted data by comparing a unique reference number or transaction details or user details included in the decrypted data with a unique reference number or transaction details or user details associated with the mobile ticket issued by the application server 104 to the user of the user device 102.

In an embodiment, the user device 102 may be further configured to display the ticket validity information associated with the mobile ticket. The ticket validity information may be displayed based on the outcome of the validation of the scanned QR code. The ticket validity information may include at least the validity information that is indicative of the positive outcome or one of the negative outcomes. The negative outcomes may include information such as, but are not limited to, the over-travel, over-time, or ticket expiration information. In an embodiment, the user device 102 may be further configured to transmit the connection request to the gate terminal 106 (from which the user device 102 has received the encrypted data), via the BLE network 110, based on the verification of the encrypted data.

In an embodiment, the gate terminal 106 may be configured to receive the connection request from the user device 102 via the BLE network 110. The gate terminal 106 may be further configured to validate the connection request. The connection request may be validated based on a distance of the user device 102 from the gate terminal 106. Alternatively, the connection request may be validated based on a signal strength of the user device 102 received by the gate terminal 106.

In an embodiment, if the connection request is successfully validated, then the gate terminal 106 may trigger the opening of the entry or exit gate to allow the user to pass through the entry or exit gate within the specified time period (for example, an entry time period or a ticket validity period) based on the successful validation of the scanned QR code. In an embodiment, the gate terminal 106 may open the entry or exit gate and display the first signal when the user is allowed to pass through the entry or exit gate. In an embodiment, if the connection request is not successfully validated, then the gate terminal 106 may not allow the user to pass through the entry or exit gate. In another embodiment, the gate terminal 106 may not allow the user to pass through the entry or exit gate based on the unsuccessful validation of the scanned QR code or the timeout of the specified time period. In an embodiment, the gate terminal 106 may display the second signal when the user is not allowed to pass through the entry or exit gate. In an embodiment, the first signal and the second signal are different from each other. The first signal and the second signal may be generated based on at least one of a color-based signal, an audio-based signal, or a text-based signal.

In an embodiment, the gate terminal 106 may be further configured to generate the acknowledgement message based on the successful validation of the scanned QR code and the connection request. Upon receiving the acknowledgement message, the user device 102 may void the QR code. In one specific example, the user device 102 may use the acknowledgement message to void the QR code after a predefined time interval. The predefined time interval may be after few minutes or hours or days. In another example, the user device 102 may void the QR code immediately after receiving the acknowledgement message. In another example, the user device 102 may void the QR code when the QR code is scanned for a predefined number of times.

Although the present disclosure describes that the user device 102 voids the QR code, the scope of the present disclosure is not limited to such examples. In various other embodiments, the gate terminal 106 may void the QR code, without deviating from the scope of the present disclosure.

Figure 2:
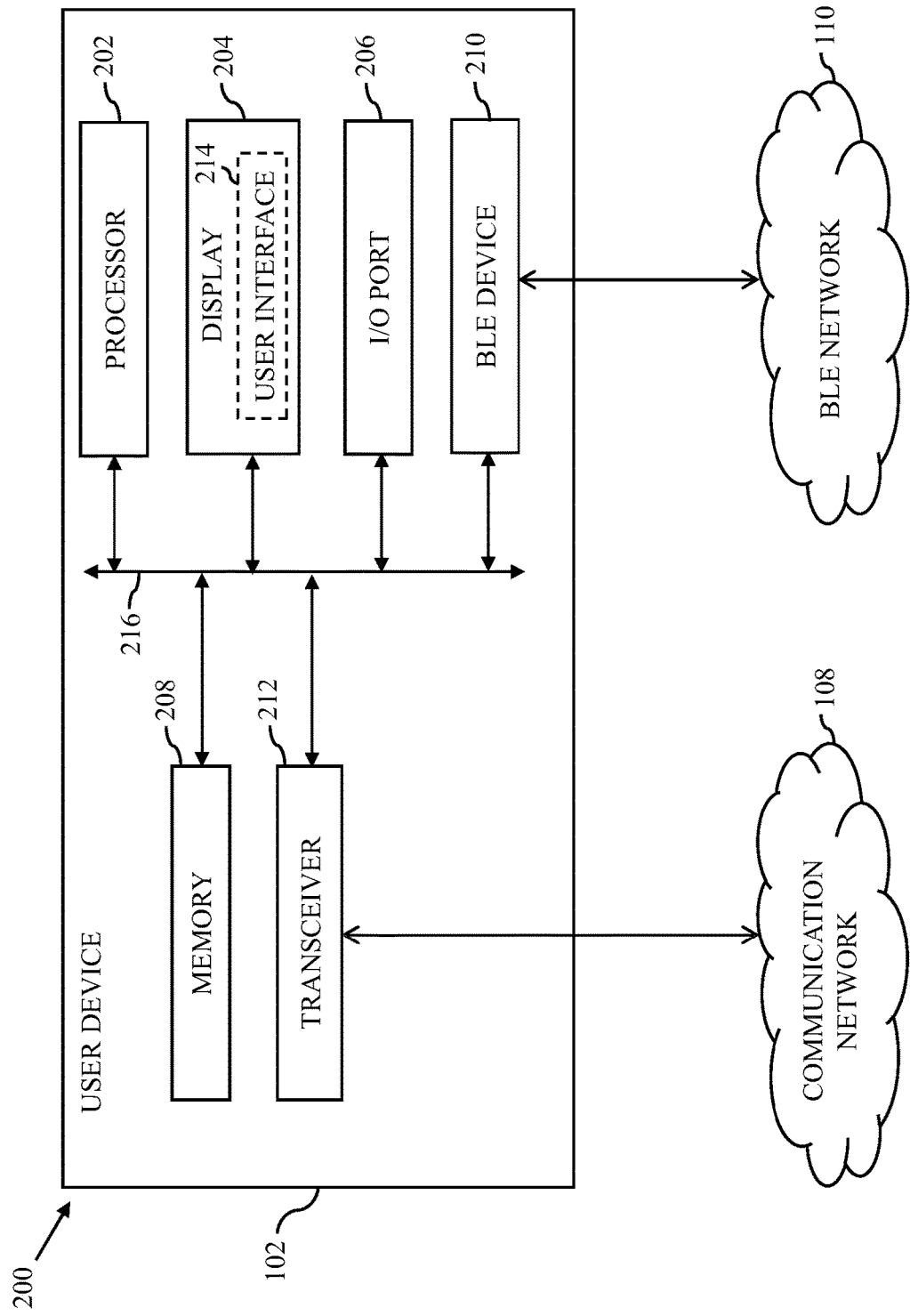
FIG. 2 is a block diagram that illustrates a user device of the environment of FIG. 1, in accordance with an exemplary embodiment of the disclosure.

FIG. 2 is a block diagram 200 that illustrates the user device 102, in accordance with an exemplary embodiment of the disclosure. The user device 102 includes circuitry such as a processor 202, a display 204, an input/output (I/O) port 206, a memory 208, a BLE device 210, a transceiver 212, and a user interface 214 for display on the display 204 that communicate with each other via a communication bus 216.

The processor 202 may include suitable logic, circuitry, interfaces, and/or code, executable by the circuitry, that may be configured to perform one or more operations associated with the mobile ticketing application. Examples of the processor 202 may include, but are not limited to, an application-specific integrated circuit (ASIC) processor, a reduced instruction set computing (RISC) processor, a complex instruction set computing (CISC) processor, and a field-programmable gate array (FPGA). It will be apparent to a person of ordinary skill in the art that the processor 202 may be compatible with multiple operating systems.

In an embodiment, the processor 202 may be configured to present the user interface 214 (rendered by the application server 104) on the display 204. The user interface 214 (such as the service application user interface) may present the various user-selectable options. The various user-selectable options may be associated with the selection and purchase of the mobile ticket by the user. The processor 202 may be configured to transmit the user selection and other requisite information corresponding to a request for the mobile ticket to the application server 104. The processor 202 may be further configured to transmit the payment request corresponding to the mobile ticket to the application server 104, by way of the transceiver 212 via the communication network 108. The processor 202 may be further configured to receive the encrypted QR data from the application server 104, by way of the transceiver 212 via the communication network 108. The processor 202 may be further configured to decrypt the encrypted QR data and format the decrypted QR data to display as the QR code associated with the mobile ticket issued to the user by the application server 104. The processor 202 may be further configured to initiate the scan for the gate terminal 106 via the BLE network 110 established by the BLE device 210. The processor 202 may be further configured to receive the encrypted data from the gate terminal 106, by way of the BLE device 210 via the BLE network 110. The processor 202 may be further configured to decrypt the received encrypted data and verify the decrypted data. The processor 202 may be further configured to transmit the connection request to the gate terminal 106, by way of the BLE device 210 via the BLE network 110. The processor 202 may be further configured to present the user interface 214 (such as the validity display user interface) on the display 204 to display the ticket validity information associated with the mobile ticket based on the validation of the QR code by the gate terminal 106.

In an embodiment, the processor 202 may operate as a master processing unit, and the display 204, the I/O port 206, the memory 208, the BLE device 210, and the transceiver 212 may operate as slave processing units. In such a scenario, the processor 202 may provide instructions and control commands to the display 204, the I/O port 206, the memory 208, the BLE device 210, and the transceiver 212 to perform the one or more operations either independently or in conjunction with each other.

The display 204 may include suitable logic, circuitry, interfaces, and/or code, executable by the circuitry, that may be configured to perform one or more display operations. For example, the display 204 may be configured to display the user interface 214 (such as the service application user interface, the payment user interface, the validity display user interface, or the like). Examples of the display 204 may include, but are not limited to, a thin film transistor liquid crystal display (TFT LCD), an in-plane switching (IPS) LCD, a Resistive Touchscreen LCD, a Capacitive Touchscreen LCD, an organic light emitting diode (OLED), an active-matrix organic light emitting diode (AMOLED), a Super AMOLED, a Retina Display, and a head-up display (HUD).

The I/O port 206 may include suitable logic, circuitry, interfaces, and/or code, executable by the circuitry, that may be configured to perform one or more input or output operations. The I/O port 206 may include input and output devices that are configured to operate under the control of the processor 202. The I/O port 206 may be used by the user to perform one or more input or output operations associated with selecting and purchasing of the mobile ticket. For example, one or more inputs may be provided by the user to open the mobile ticketing application on the user device 102, select the mobile ticket, initiate the payment request for booking the mobile ticket, or the like. Examples of the input devices may include a universal serial bus (USB) port, an Ethernet port, a real or virtual keyboard, a mouse, a joystick, a touch screen, a stylus, a microphone, or the like. Examples of the output devices may include the display 204, a speaker, headphones, a USB port, an Ethernet port, or the like.

The memory 208 may include suitable logic, circuitry, interfaces, and/or code, executable by the circuitry, that may be configured to store one or more instructions that are executed by the processor 202, the display 204, the I/O port 206, the BLE device 210, and the transceiver 212 to perform their operations. In an exemplary embodiment, the memory 208 may be configured to temporarily store the mobile ticketing information associated with the mobile ticket. The memory 208 may be further configured to temporarily store the user details of the user and the payment details. The memory 208 may be further configured to temporarily store the network details of the communication network 108 and the BLE network 110. The memory 208 may be further configured to temporarily store the encrypted QR data, the QR code, the encrypted data associated with the QR code, the validation and verification results, the connection request, or the like. Examples of the memory 208 may include, but are not limited to, a random-access memory (RAM), a read-only memory (ROM), a programmable ROM (PROM), and an erasable PROM (EPROM).

The BLE device 210 may include suitable logic, circuitry, interfaces, and/or code, executable by the circuitry, that may be configured to transmit (or receive) data to (or from) various servers or devices, such as the gate terminal 106 via the BLE network 110. The BLE device 210 may be a Bluetooth transceiver. The BLE device 210 may be configured to communicate with the gate terminal 106 using various wireless communication protocols such as Bluetooth v4.0 or above.

The transceiver 212 may include suitable logic, circuitry, interfaces, and/or code, executable by the circuitry, that may be configured to transmit (or receive) data to (or from) various servers or devices, such as the application server 104 via the communication network 108. Examples of the transceiver 212 may include, but are not limited to, an antenna, a radio frequency transceiver, a wireless transceiver, and a Bluetooth transceiver. The transceiver 212 may be configured to communicate with the application server 104 using various wired and wireless communication protocols, such as TCP/IP, UDP, LTE communication protocols, or any combination thereof.

Figure 3:
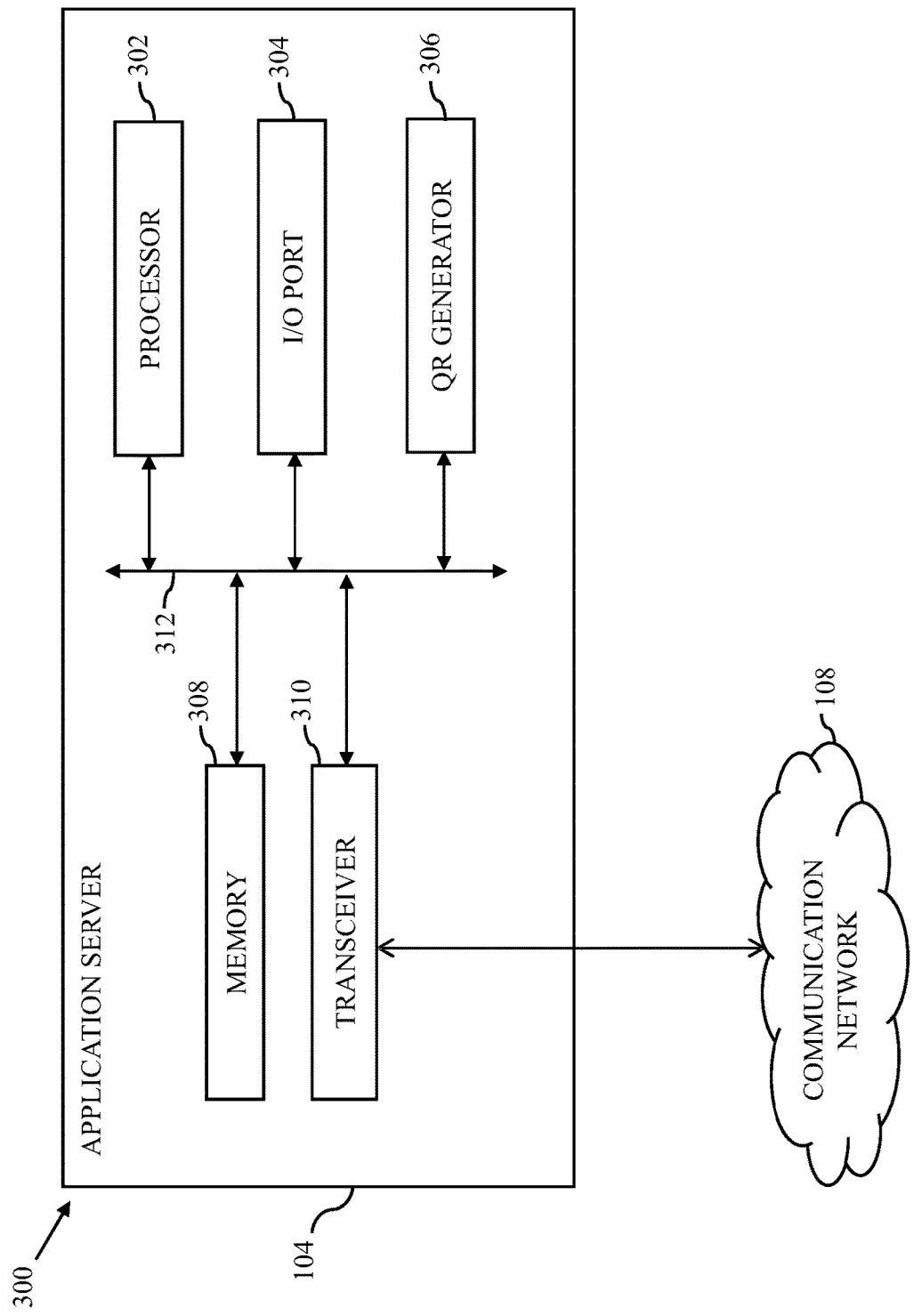
FIG. 3 is a block diagram that illustrates an application server of the environment of FIG. 1, in accordance with an exemplary embodiment of the disclosure.

FIG. 3 is a block diagram 300 that illustrates the application server 104, in accordance with an exemplary embodiment of the disclosure. The application server 104 includes circuitry such as a processor 302, a I/O port 304, a QR generator 306, a memory 308, and a transceiver 310 that communicate with each other via a communication bus 312.

The processor 302 may include suitable logic, circuitry, interfaces, and/or code, executable by the circuitry, that may be configured to perform one or more operations for generating the one or more mobile tickets and processing the one or more payment requests corresponding to the one or more mobile tickets. Examples of the processor 302 may include, but are not limited to, an ASIC processor, a RISC processor, a CISC processor, and an FPGA. It will be apparent to a person of ordinary skill in the art that the processor 302 may be compatible with multiple operating systems.

In an embodiment, the processor 302 may be configured to render the user interface 214 (such as the service application user interface, the payment user interface, the validity display user interface, or the like) on the user device 102. The processor 302 may be further configured to determine the ticket price for the mobile ticket based on the selection of at least one of the various user-selectable options by the user. The processor 302 may be further configured to communicate one or more notifications, instructions, or commands to the user device 102.

The processor 302 may be further configured to receive the payment request from the user device 102, by way of transceiver 310 via the communication network 108. The processor 302 may be further configured to process the payment request. In an exemplary embodiment, the processor 302 may be configured to control and manage the QR generator 306 to generate the encrypted QR data including the QR code and other mobile ticketing information based on the successful processing of the payment request.

In an embodiment, the processor 302 may operate as a master processing unit, and the I/O port 304, the QR generator 306, the memory 308, and the transceiver 310 may operate as slave processing units. In such a scenario, the processor 302 may provide instructions and control commands to the I/O port 304, the QR generator 306, the memory 308, and the transceiver 310 to perform the one or more operations either independently or in conjunction with each other.

The I/O port 304 may include suitable logic, circuitry, interfaces, and/or code, executable by the circuitry, that may be configured to perform one or more input or output operations. The I/O port 304 may include input and output devices that are configured to operate under the control of the processor 302. The I/O port 304 may be used by an administrator of the service provider to perform one or more input or output operations associated with selecting and purchasing of the mobile ticket by the user. Examples of the input devices may include a USB port, an Ethernet port, a real or virtual keyboard, a mouse, a joystick, a touch screen, a stylus, a microphone, or the like. Examples of the output devices may include a display, a speaker, headphones, a USB port, an Ethernet port, or the like.

The QR generator 306 may include suitable logic, circuitry, interfaces, and/or code, executable by the circuitry, that may be configured to perform one or more operations associated with the generation of the QR code. The QR generator 306 may be implemented by one or more processors, such as, but are not limited to, an ASIC processor, a RISC processor, a CISC processor, and an FPGA processor. Further, the QR generator 306 may include a machine-learning model that implements any suitable machine-learning techniques, statistical techniques, or probabilistic techniques for performing the one or more operations for generating the QR code. In an embodiment, based on the successful processing of the payment request by the processor 302, the QR generator 306 may be configured to generate the QR data corresponding to the mobile ticket selected by the user. The QR data may include the QR code having a unique reference number associated with the purchase of the mobile ticket by the user. The QR data may also include the mobile ticketing information associated with at least one of an entry time period, an exit time period, a ticket validity period, an entry location, an exit location, a ticket type, a number of tickets, a ticket price, user details, transaction details, or the like. Further, the QR generator 306 may be configured to encrypt the QR data to generate the encrypted QR data. The QR data may be encrypted by using one or more encryption techniques based on AES, 3DES, Twofish, or the like. Alternatively, the processor 302 may encrypt the QR data to generate the encrypted QR data.

The memory 308 may include suitable logic, circuitry, interfaces, and/or code, executable by the circuitry, that may be configured to store one or more instructions that are executed by the processor 302, the I/O port 304, the QR generator 306, and the transceiver 310 to perform their operations. In an exemplary embodiment, the memory 308 may be configured to temporarily store and manage the user selection, the payment request, the user details, the payment details, or the like. Examples of the memory 308 may include, but are not limited to, a RAM, a ROM, a PROM, and an EPROM.

The transceiver 310 may include suitable logic, circuitry, interfaces, and/or code, executable by the circuitry, that may be configured to transmit (or receive) data to (or from) various servers or devices, such as the user device 102 via the communication network 108. Examples of the transceiver 310 may include, but are not limited to, an antenna, a radio frequency transceiver, a wireless transceiver, and a Bluetooth transceiver. The transceiver 310 may be configured to communicate with the user device 102 using various wired and wireless communication protocols, such as TCP/IP, UDP, LTE communication protocols, or any combination thereof.

Figure 4:
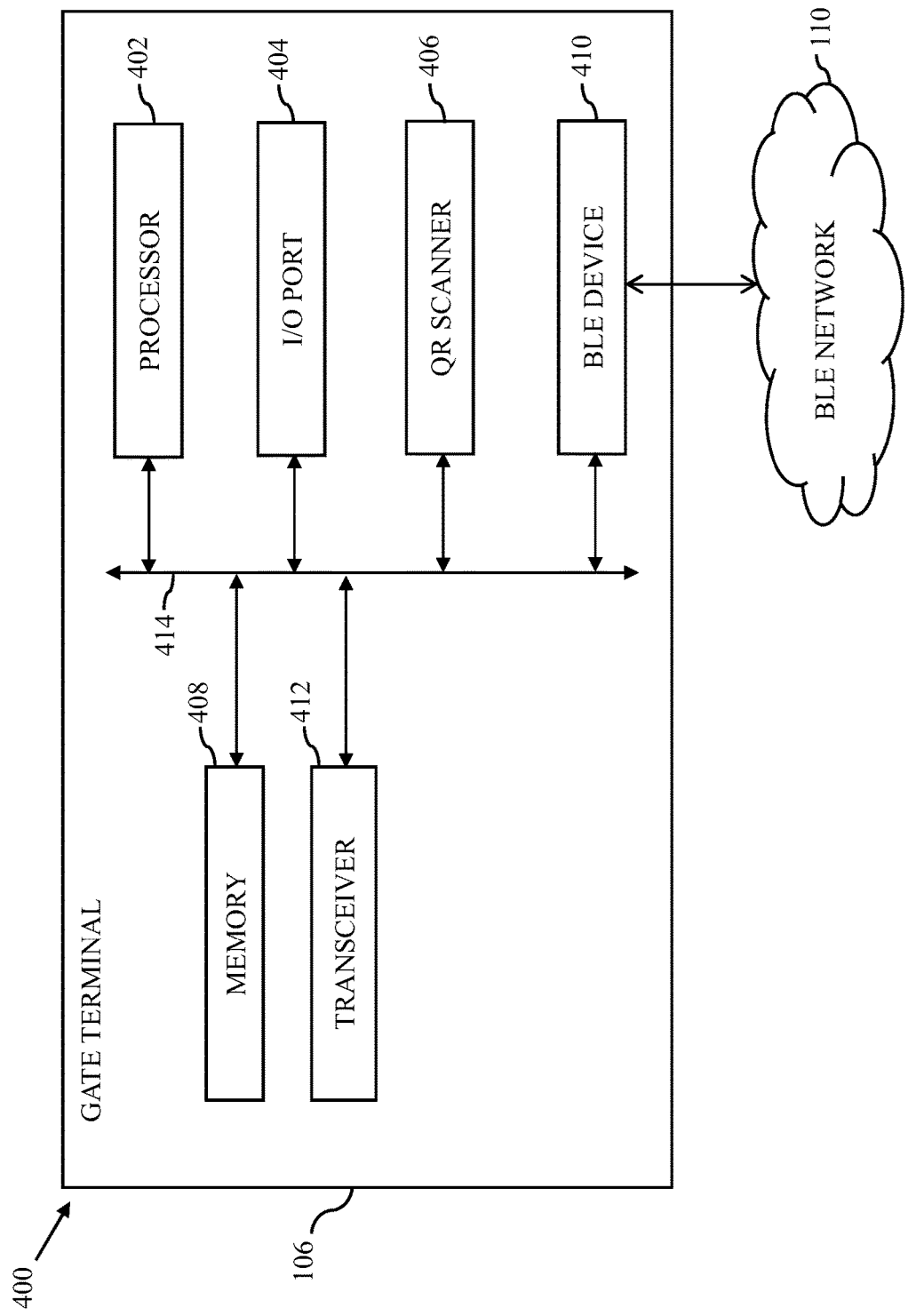
FIG. 4 is a block diagram that illustrates a gate terminal of the environment of FIG. 1, in accordance with an exemplary embodiment of the disclosure.

FIG. 4 is a block diagram 400 that illustrates the gate terminal 106, in accordance with an exemplary embodiment of the disclosure. The gate terminal 106 includes circuitry such as a processor 402, a I/O port 404, a QR scanner 406, a memory 408, a BLE device 410, and a transceiver 412 that communicate with each other via a communication bus 414.

The processor 402 may include suitable logic, circuitry, interfaces, and/or code, executable by the circuitry, that may be configured to perform one or more operations associated with the entry or exit gate of the paid area or the vehicle. Examples of the processor 402 may include, but are not limited to, an ASIC processor, a RISC processor, a CISC processor, and an FPGA. It will be apparent to a person of ordinary skill in the art that the processor 402 may be compatible with multiple operating systems.

In an embodiment, the processor 402 may be configured to control and manage the entry or exit of one or more users (such as the user of the user device 102) through the entry or exit gate. In an exemplary embodiment, the processor 402 may be configured to facilitate the scanning of the QR code from the user device 102, by way of the QR scanner 406. The processor 402 may be further configured to validate the scanned QR code. The processor 402 may be further configured to generate the encrypted data pertaining to the scanned QR code. The processor 402 may be further configured to transmit the encrypted data to the user device 102, by way of the transceiver 412 or the BLE device 410 via the BLE network 110. The processor 402 may be further configured to receive the connection request from the user device 102, by way of the BLE device 410 via the BLE network 110. The processor 402 may be further configured to validate the connection request received from the user device 102. The processor 402 may be further configured to determine an outcome based on the validation of the connection request i.e., whether the connection request is successfully validated or not. The processor 402 may be further configured to trigger the opening of the entry or exit gate to allow the user to pass through the entry or exit gate within the specified time period based on the successful validation of the scanned QR code, when the connection request is successfully validated. The processor 402 may be further configured to disallow the user to pass through the entry or exit gate based on the unsuccessful validation of the scanned QR code or the timeout of the specified time period.

The I/O port 404 may include suitable logic, circuitry, interfaces, and/or code, executable by the circuitry, that may be configured to perform one or more input or output operations. The I/O port 404 may include input and output devices that are configured to operate under the control of the processor 402. The I/O port 404 may be used by an administrator of the entry or exit gate (or the gate terminal 106) to perform one or more input or output operations associated with the entry or exit of the one or more users. Examples of the input devices may include a USB port, an Ethernet port, a real or virtual keyboard, a mouse, a joystick, a touch screen, a stylus, a microphone, or the like. Examples of the output devices may include a display, a speaker, headphones, a USB port, an Ethernet port, or the like.

The QR scanner 406 may include suitable logic, circuitry, interfaces, and/or code, executable by the circuitry, that may be configured to perform one or more operations associated with the scanning of the QR code from the user device 102. The QR scanner 406 may be implemented by one or more processors, such as, but are not limited to, an ASIC processor, a RISC processor, a CISC processor, and an FPGA processor.

The memory 408 may include suitable logic, circuitry, interfaces, and/or code, executable by the circuitry, that may be configured to store one or more instructions that are executed by the processor 402, the I/O port 404, the QR scanner 406, the BLE device 410, and the transceiver 412 to perform their operations. In an exemplary embodiment, the memory 408 may be configured to temporarily store and manage the scanned QR code. The memory 408 may be further configured to temporarily store and manage the encrypted data, the connection request, the validation results, or the like. Examples of the memory 408 may include, but are not limited to, a RAM, a ROM, a PROM, and an EPROM.

The BLE device 410 may include suitable logic, circuitry, interfaces, and/or code, executable by the circuitry, that may be configured to transmit (or receive) data to (or from) various servers or devices, such as the user device 102 via the BLE network 110. The BLE device 410 may be a Bluetooth transceiver. The BLE device 410 may be configured to communicate with the user device 102 using various wireless communication protocols such as Bluetooth v4.0 or above.

The transceiver 412 may include suitable logic, circuitry, interfaces, and/or code, executable by the circuitry, that may be configured to transmit (or receive) data to (or from) various servers or devices, such as the user device 102 or the application server 104. Examples of the transceiver 412 may include, but are not limited to, an antenna, a radio frequency transceiver, a wireless transceiver, and a Bluetooth transceiver. The transceiver 412 may be configured to communicate with the user device 102 or the application server 104 using various wired and wireless communication protocols, such as TCP/IP, UDP, LTE communication protocols, or any combination thereof.

Figure 5A:
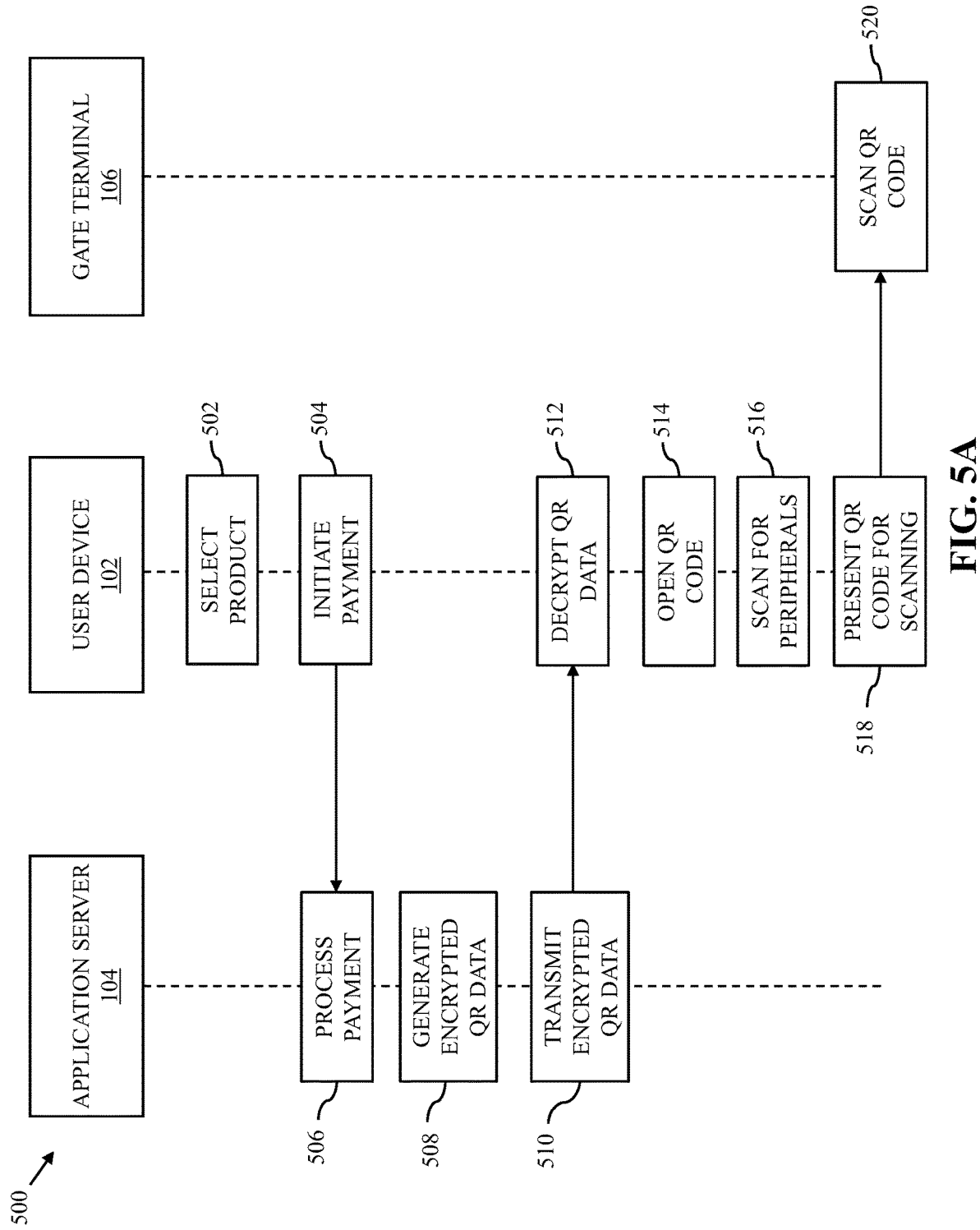
FIGS. 5A, 5B, and 5C are diagrams that collectively illustrate a process flow for providing mobile ticketing services to a user, in accordance with an exemplary embodiment of the disclosure.
Figure 5B:
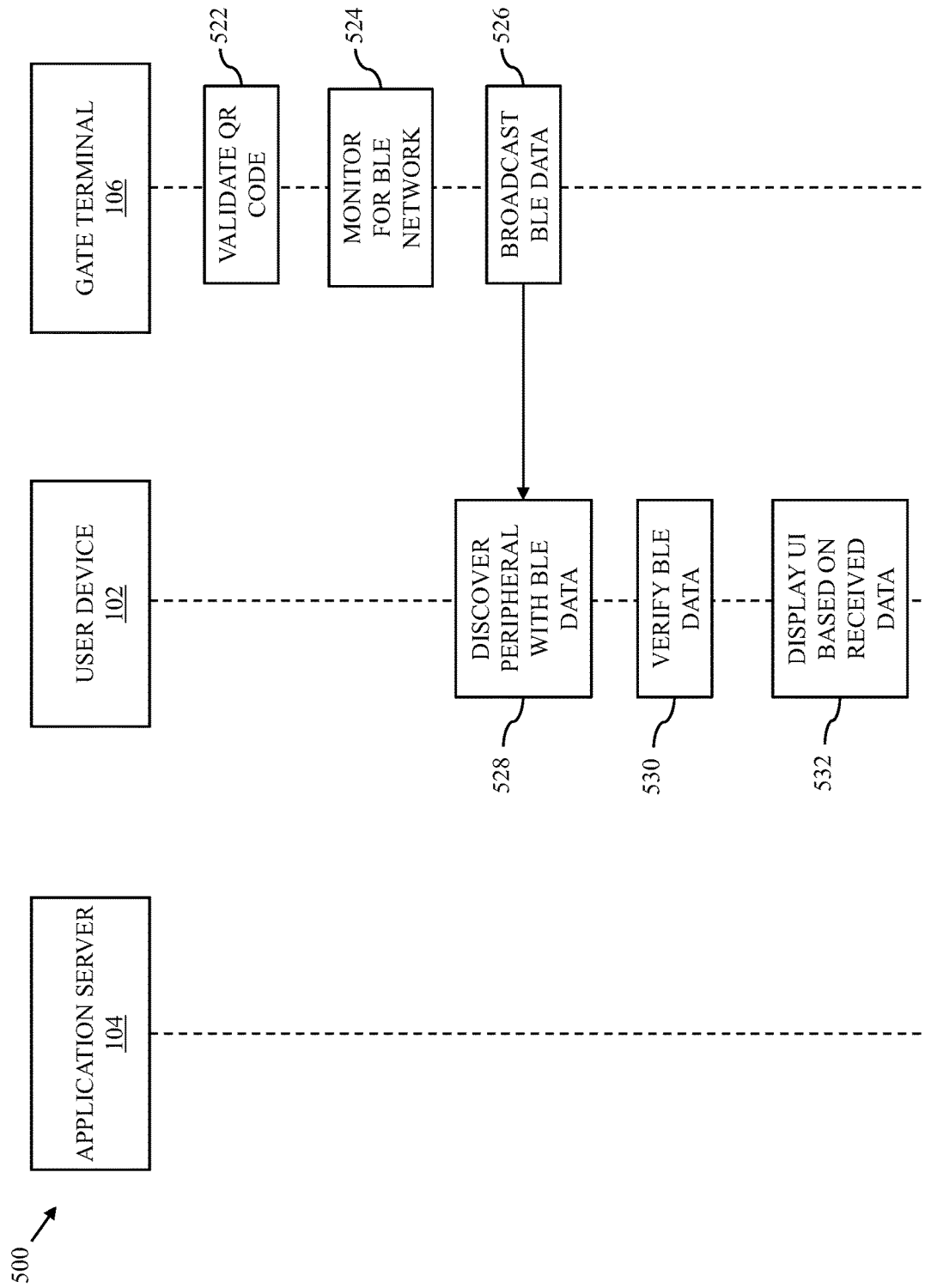
Figure 5C:
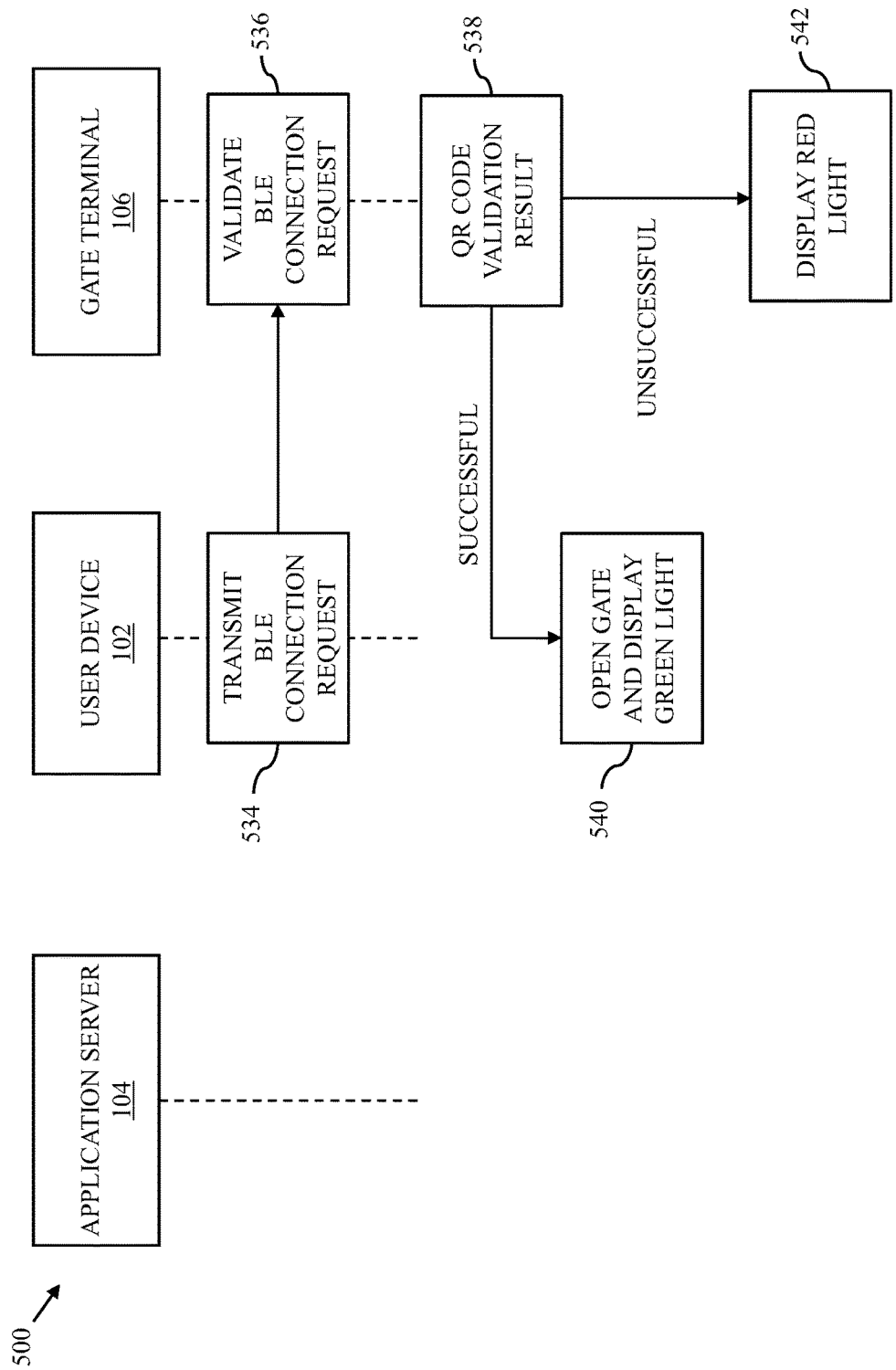

FIGS. 5A, 5B, and 5C are diagrams that collectively illustrate a process flow 500 for providing mobile ticketing to the user, in accordance with an exemplary embodiment of the disclosure.

At 502, a product, for example, the mobile ticket associated with the entry or exit gate is selected by the user. In an embodiment, the user may select the mobile ticket by using the mobile ticketing application running on the user device 102.

At 504, the user device 102 initiates a payment for the mobile ticket based on the selection and confirmation of the mobile ticket by the user. In an embodiment, the user device 102 may transmit the payment request (corresponding to the payment for the mobile ticket) to the application server 104.

At 506, the application server 104 processes the payment request received from the user device 102. At 508, the application server 104 generates the encrypted QR data based on the successful processing of the payment request. The encrypted QR data may include the encrypted QR code having a unique reference number associated with the purchase of the mobile ticket. The encrypted QR data may also include the encrypted mobile ticketing information associated with at least one of an entry time period, an exit time period, a ticket validity period, an entry location, an exit location, a ticket type, a number of tickets, a ticket price, user details, transaction details, or the like.

At 510, the application server 104 transmits the encrypted QR data to the user device 102 via the communication network 108. At 512, the encrypted QR data is received by the user device 102. In an embodiment, the user device 102 may decrypt the encrypted QR data and format the decrypted QR data to display as the QR code. At 514, the user may open the QR code via the mobile ticketing application running on the user device 102.

At 516, the user device 102 scans for peripherals such as the gate terminal 106. In an embodiment, the user device 102 may scan for the gate terminal 106 based on the opening of the QR code. For example, the user device 102 may initiate the scan for the gate terminal 106 in response to the user opening the QR code on the user device 102.

At 518, the user device 102 presents the QR code for scanning. In an embodiment, the QR code may be rendered on the display (such as the display 204) of the user device 102 and may be held in front of the QR scanner 406 associated with the gate terminal 106 to present the QR code for scanning.

At 520, the QR scanner 406 scans the QR code from the user device 102. At 522, the gate terminal 106 validates the scanned QR code. In an embodiment, the gate terminal 106 may execute the validation process to determine the successful validation or unsuccessful validation of the scanned QR code.

At 524, the gate terminal 106 monitors for BLE enabled devices such as the user device 102. In an embodiment, the gate terminal 106 may monitor for BLE connections (such as the BLE network 110) based on the validation of the scanned QR code from the user device 102.

At 526, the gate terminal 106 broadcasts the BLE data. In an embodiment, the gate terminal 106 may generate and transmit the BLE data including the encrypted data pertaining to the scanned QR code via the BLE network 110. The encrypted data may be generated based on the validation of the scanned QR code.

At 528, the user device 102 discovers the peripheral (such as the gate terminal 106) based on the BLE data transmitted by the gate terminal 106. In an embodiment, the user device 102 may discover the peripheral based on the transmitted BLE data. For example, the user device 102 may discover the gate terminal 106 based on the encrypted data being transmitted by the gate terminal 106 via the BLE network 110.

At 530, the user device 102 verifies the BLE data. In an embodiment, the user device 102 may decrypt the BLE data (i.e., the encrypted data) received from the gate terminal 106 and verify the decrypted data. In an embodiment, the user device 102 may verify the decrypted data by comparing one or more details (e.g., user details or transaction details) of the decrypted data with one or more details (e.g., user details or transaction details) of the mobile ticket.

At 532, the user device 102 displays the ticket validity information on the validity display user interface (such as the user interface 214) based on the received data. In an embodiment, the user device 102 may display the ticket validity information associated with the mobile ticket based on the validation of the QR code by the gate terminal 106. The ticket validity information may include at least the validity information indicative of the positive outcome or one of the negative outcomes. The negative outcomes may include information such as, but are not limited to, the over-travel, over-time, or ticket expiration information.

At 534, the user device 102 transmits the connection request (i.e., a BLE connection request) to the gate terminal 106 via the BLE network 110. In an embodiment, the user device 102 may transmit the connection request to the gate terminal 106 based on the verification of the encrypted data.

At 536, the gate terminal 106 validates the BLE connection request received from the user device 102. At 538, the gate terminal 106 processes the QR code validation result (determined at 522). If it is determined that the connection request and the QR code are successfully validated and the specified time period has not timed out, then the control passes to 540. However, if it is determined that the connection request is not successfully validated, the QR code is not successfully validated, the specified time period has timed out, or any combination thereof, then the control passes to 542.

At 540, the entry or exit gate is opened and the first signal (e.g., a green light) is displayed. At 542, the entry or exit gate is not opened and the second signal (e.g., a red light) is displayed.

Figure 6A:
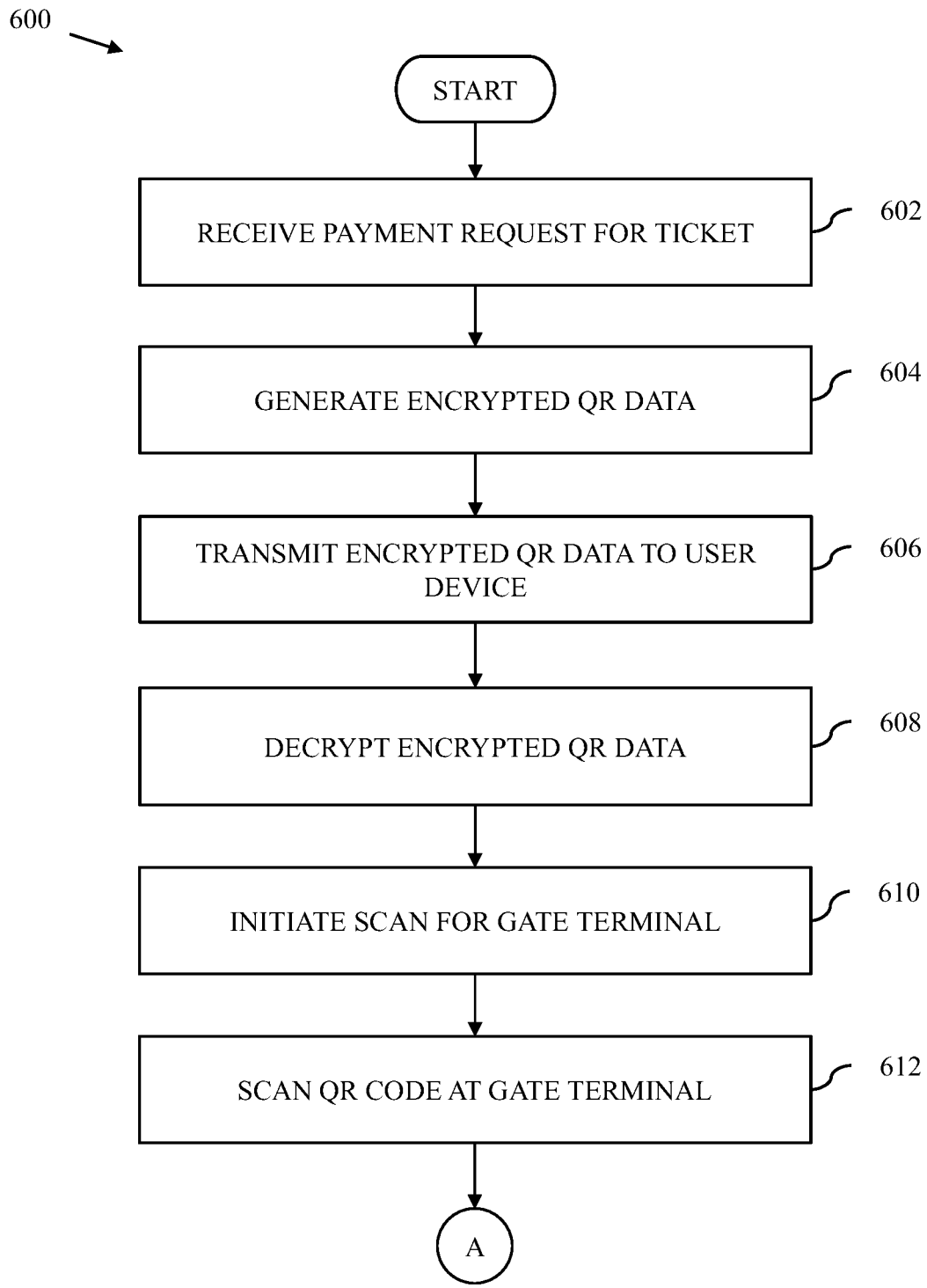
FIGS. 6A and 6B are diagrams that collectively illustrate a flow chart of a method for providing mobile ticketing services to the user, in accordance with an exemplary embodiment of the disclosure.
Figure 6B:
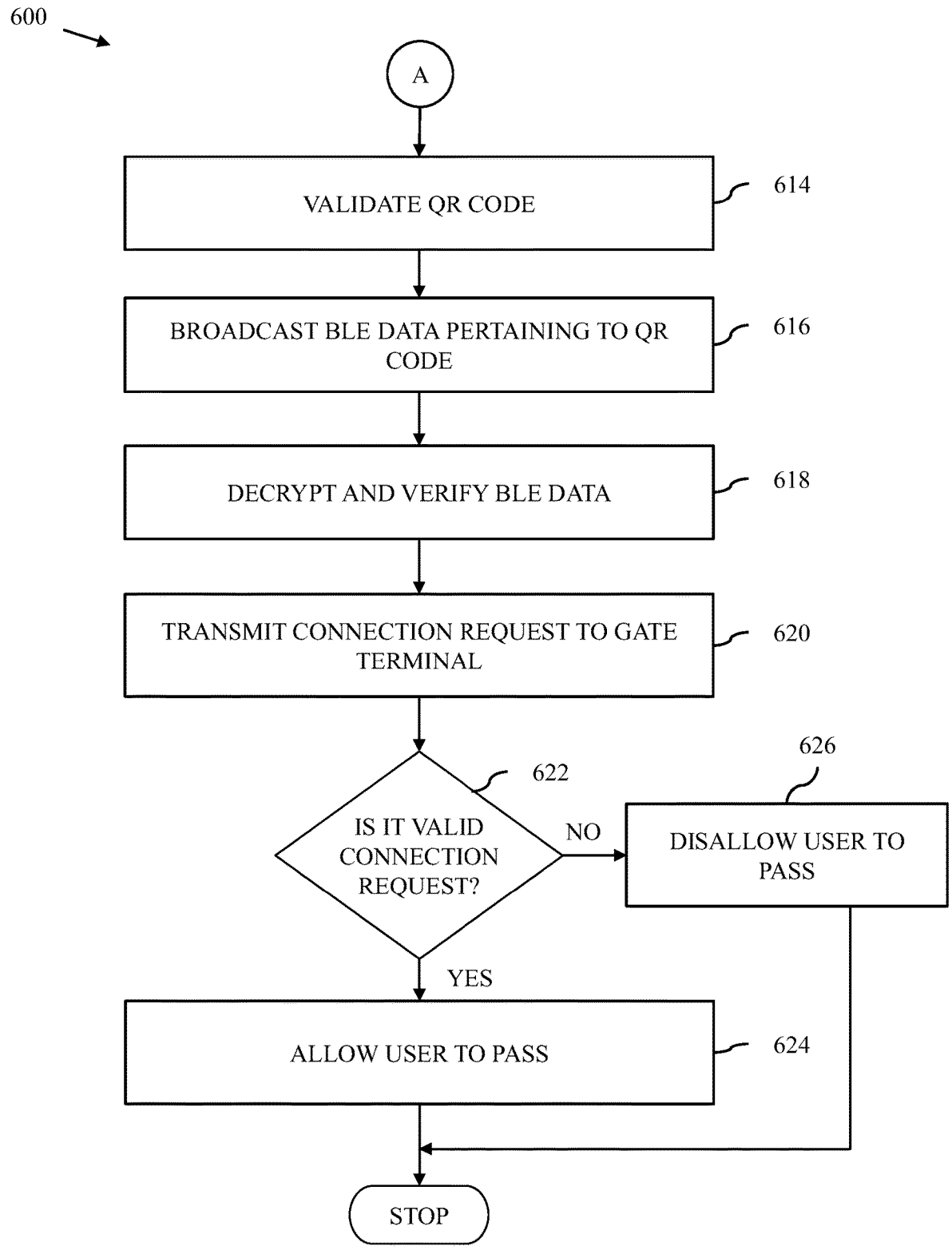

FIGS. 6A and 6B are diagrams that collectively illustrate a flow chart 600 of a method for providing mobile ticketing services to the user, in accordance with an exemplary embodiment of the disclosure.

At 602, the payment request for the mobile ticket is received. In an embodiment, the application server 104 may be configured to receive the payment request from the user device 102. Thereafter, the application server 104 may be configured to process the payment request.

At 604, the encrypted QR data is generated. In an embodiment, the application server 104 may be configured to generate the encrypted QR data based on the successful processing of the payment request. The encrypted QR data may include the encrypted QR code having a unique reference number associated with the purchase of the mobile ticket. The encrypted QR data may also include the encrypted mobile ticketing information associated with at least one of an entry time period, an exit time period, a ticket validity period, an entry location, an exit location, a ticket type, a number of tickets, a ticket price, user details, transaction details, or the like.

At 606, the encrypted QR data is transmitted to the user device 102. In an embodiment, the application server 104 may be configured to transmit the encrypted QR data to the user device 102 via the communication network 108.

At 608, the encrypted QR data is decrypted. In an embodiment, the user device 102 may be configured to receive the encrypted QR data from the application server 104. Further, the user device 102 may be configured to decrypt the encrypted QR data and format the decrypted QR data to display as the QR code.

At 610, the scan for the gate terminal 106 is initiated. In an embodiment, the user device 102 may be configured to initiate the scan for the peripherals such as the gate terminal 106. The user device 102 may scan for the gate terminal 106 based on the opening of the QR code on the user device 102 by the user.

At 612, the QR code is scanned at the gate terminal 106. In an embodiment, the user device 102 may present the QR code for scanning by the QR scanner 406 of the gate terminal 106.

At 614, the QR code is validated. In an embodiment, the gate terminal 106 may be further configured to validate the scanned QR code and determine a validation outcome (such as the successful validation or unsuccessful validation of the scanned QR code).

At 616, the BLE data pertaining to the scanned QR code is broadcasted. In an embodiment, the gate terminal 106 may be configured to monitor for BLE enabled devices such as the user device 102. The gate terminal 106 may monitor for BLE connections (such as the BLE network 110) based on the validation of the scanned QR code. Thereafter, the gate terminal 106 may broadcast the BLE data including the encrypted data pertaining to the scanned QR code via the BLE network 110.

At 618, the BLE data (i.e., the encrypted data) is decrypted and verified. In an embodiment, the user device 102 may be configured to decrypt the encrypted data and verify the decrypted data. The user device 102 may also display the ticket validity information associated with the mobile ticket by presenting the validity display user interface (such as the user interface 214).

At 620, the connection request is transmitted to the gate terminal 106. In an embodiment, the user device 102 may be configured to transmit the connection request (i.e., a BLE connection request) to the gate terminal 106 via the BLE network 110. The user device 102 may transmit the connection request to the gate terminal 106 based on the verification of the received encrypted data.

At 622, the validation of the connection request is checked. The gate terminal 106 may be configured to check the validation of the connection request received from the user device 102. If, at 622, it is determined that the connection request is successfully validated, and if the QR code has been already successfully validated (at 614) and the specified time period has not timed out, then the control passes to 624. However, if at 622, it is determined that the connection request is not successfully validated, the QR code is not successfully validated, the specified time period has timed out, or any combination thereof, then the control passes to 626.

At 624, the user is allowed to pass through the entry or exit gate. In an embodiment, the gate terminal 106 may be configured to open the entry or exit gate and display the first signal (e.g., a green light) to allow the user to pass through the entry or exit gate.

At 626, the user is not allowed to pass through the entry or exit gate. In an embodiment, the gate terminal 106 may not open the entry or exit gate and display the second signal (e.g., a green light) to disallow the user to pass through the entry or exit gate.

Figure 7:
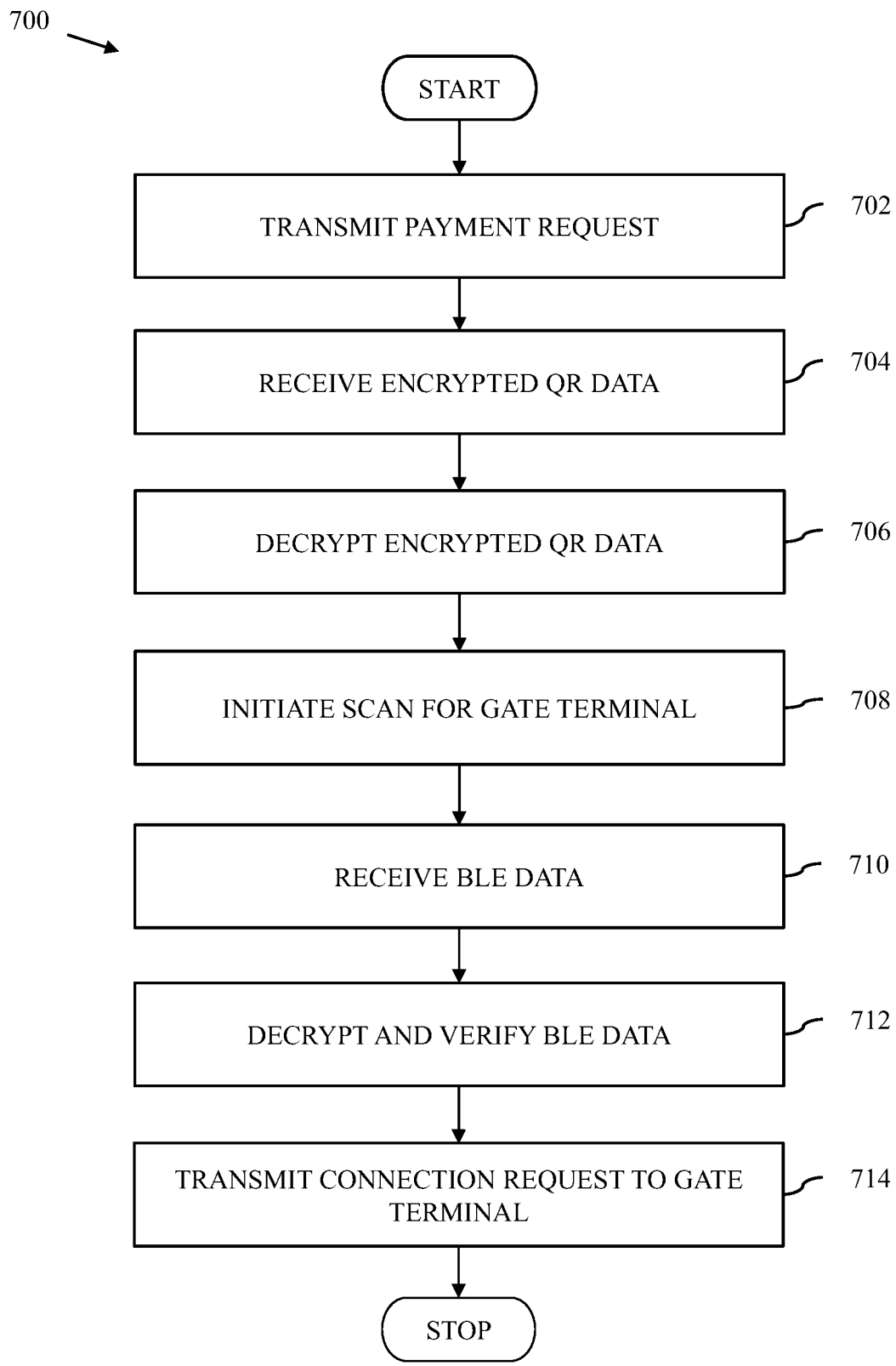
FIG. 7 is a diagram that illustrates a flow chart of a method for providing the mobile ticketing services to the user, in accordance with another exemplary embodiment of the disclosure.

FIG. 7 is a diagram that illustrates a flow chart 700 of a method for providing the mobile ticketing services to the user, in accordance with another exemplary embodiment of the disclosure.

At 702, the payment request is transmitted. In an embodiment, the user device 102 may be configured to transmit the payment request to the application server 104. The payment request may correspond to the mobile ticket selected by the user of the user device 102.

At 704, the encrypted QR data is received. In an embodiment, the user device 102 may be configured to receive the encrypted QR data from the application server 104. The encrypted QR data may be received based on the successful processing of the payment request by the application server 104. The encrypted QR data may include the encrypted QR code having a unique reference number associated with the purchase of the mobile ticket. The encrypted QR data may also include the encrypted mobile ticketing information associated with at least one of an entry time period, an exit time period, a ticket validity period, an entry location, an exit location, a ticket type, a number of tickets, a ticket price, user details, transaction details, or the like.

At 706, the encrypted QR data is decrypted. In an embodiment, the user device 102 may be configured to receive the encrypted QR data from the application server 104. Further, the user device 102 may be configured to decrypt the encrypted QR data and format the decrypted QR data to display as the QR code.

At 708, the scan for the gate terminal 106 is initiated. In an embodiment, the user device 102 may be configured to initiate the scan for the peripherals such as the gate terminal 106. The user device 102 may scan for the gate terminal 106 based on the opening of the QR code on the user device 102 by the user. Thereafter, the QR code is scanned by the QR scanner 406 from the user device 102. Further, the scanned QR code is validated by the gate terminal 106.

At 710, the BLE data is received. In an embodiment, the user device 102 may be configured to receive the BLE data including the encrypted data from the gate terminal 106 via the BLE network 110. The encrypted data may be generated based on the validation of the scanned QR code.

At 712, the BLE data (i.e., the encrypted data) is decrypted and verified. In an embodiment, the user device 102 may be configured to decrypt the encrypted data and verify the decrypted data. The user device 102 may also display the ticket validity information associated with the mobile ticket by presenting the validity display user interface (such as the user interface 214).

At 714, the connection request is transmitted to the gate terminal 106. In an embodiment, the user device 102 may be configured to transmit the connection request (i.e., a BLE connection request) to the gate terminal 106 via the BLE network 110. The user device 102 may transmit the connection request to the gate terminal 106 based on the verification of the received encrypted data. Further, the connection request may be validated by the gate terminal 106. Thereafter, the user may be allowed to pass through the entry or exit gate within the specified time period based on the successful validation of the scanned QR code, when the connection request is also successfully validated. The user may not be allowed to pass through the entry or exit gate in case of the unsuccessful validation of the scanned QR code or the timeout of the specified time period.

Figure 8:
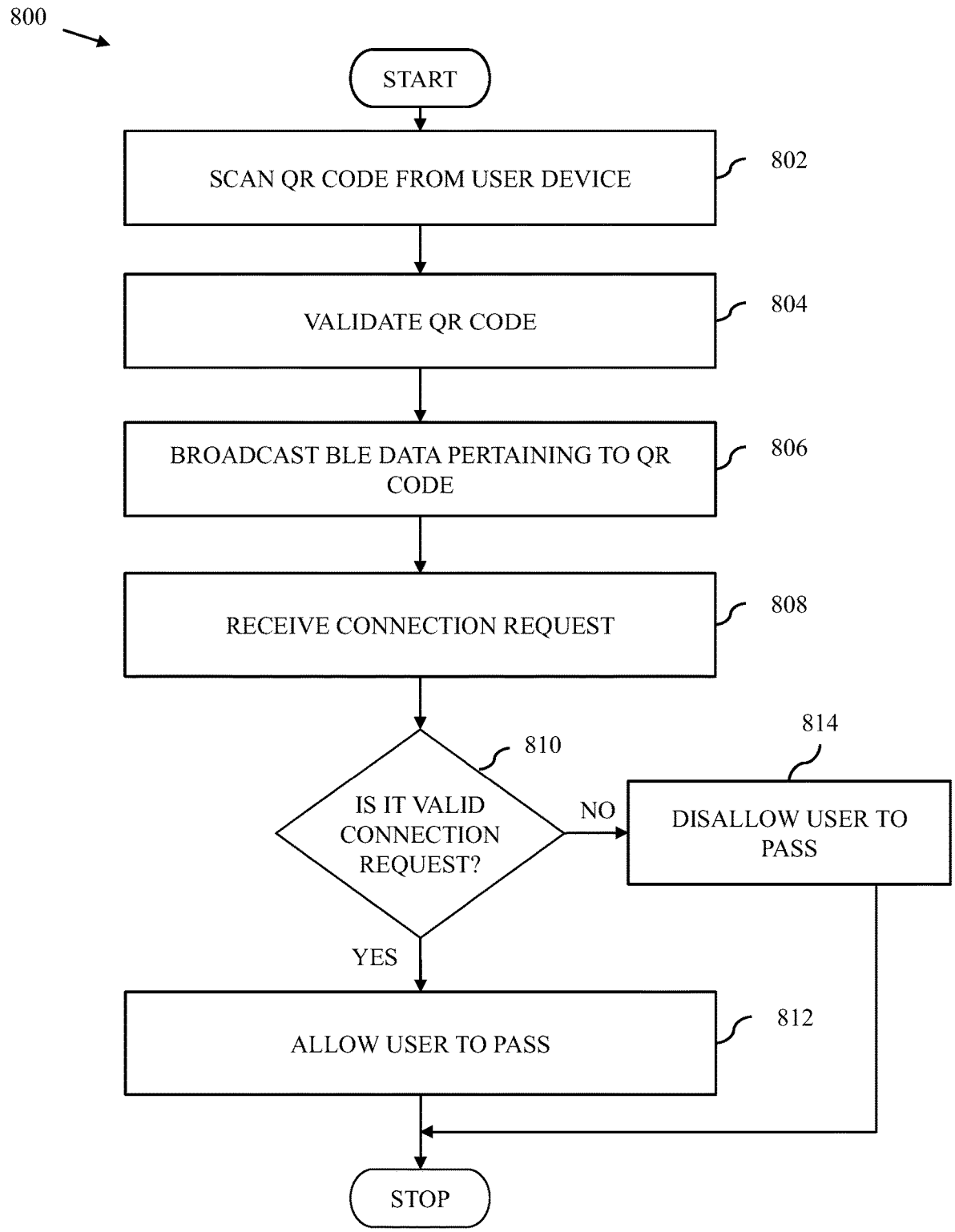
FIG. 8 is a diagram that illustrates a flow chart of a method for providing the mobile ticketing services to the user, in accordance with another exemplary embodiment of the disclosure.

FIG. 8 is a diagram that illustrates a flow chart 800 of a method for providing the mobile ticketing services to the user, in accordance with another exemplary embodiment of the disclosure.

At 802, the QR code is scanned from the user device 102. In an embodiment, the gate terminal 106 may use the QR scanner 406 to scan the QR code from the user device 102.

At 804, the QR code is validated. In an embodiment, the gate terminal 106 may be configured to validate the scanned QR code and determine a validation outcome (such as the successful validation or unsuccessful validation of the scanned QR code).

At 806, the BLE data pertaining to the scanned QR code is broadcasted. In an embodiment, the gate terminal 106 may be configured to monitor for BLE enabled devices such as the user device 102. The gate terminal 106 may monitor for BLE connections (such as the BLE network 110) based on the validation of the scanned QR code. Thereafter, the gate terminal 106 may broadcast the BLE data including the encrypted data pertaining to the scanned QR code via the BLE network 110.

At 808, the connection request is received. In an embodiment, the gate terminal 106 may be configured to receive the connection request (i.e., a BLE connection request) from the user device 102 via the BLE network 110.

At 810, the validation of the connection request is checked. The gate terminal 106 may be configured to check the validation of the connection request received from the user device 102. If, at 810, it is determined that the connection request is successfully validated, and if the QR code has been already successfully validated (at 804) and the specified time period has not timed out, then the control passes to 812. However, if at 810, it is determined that the connection request is not successfully validated, the QR code is not successfully validated, the specified time period has timed out, or any combination thereof, then the control passes to 814.

At 812, the user is allowed to pass through the entry or exit gate. In an embodiment, the gate terminal 106 may be configured to open the entry or exit gate and display the first signal (e.g., a green light) to allow the user to pass through the entry or exit gate.

At 814, the user is not allowed to pass through the entry or exit gate. In an embodiment, the gate terminal 106 may not open the entry or exit gate and display the second signal (e.g., a green light) to disallow the user to pass through the entry or exit gate.

Figure 9:
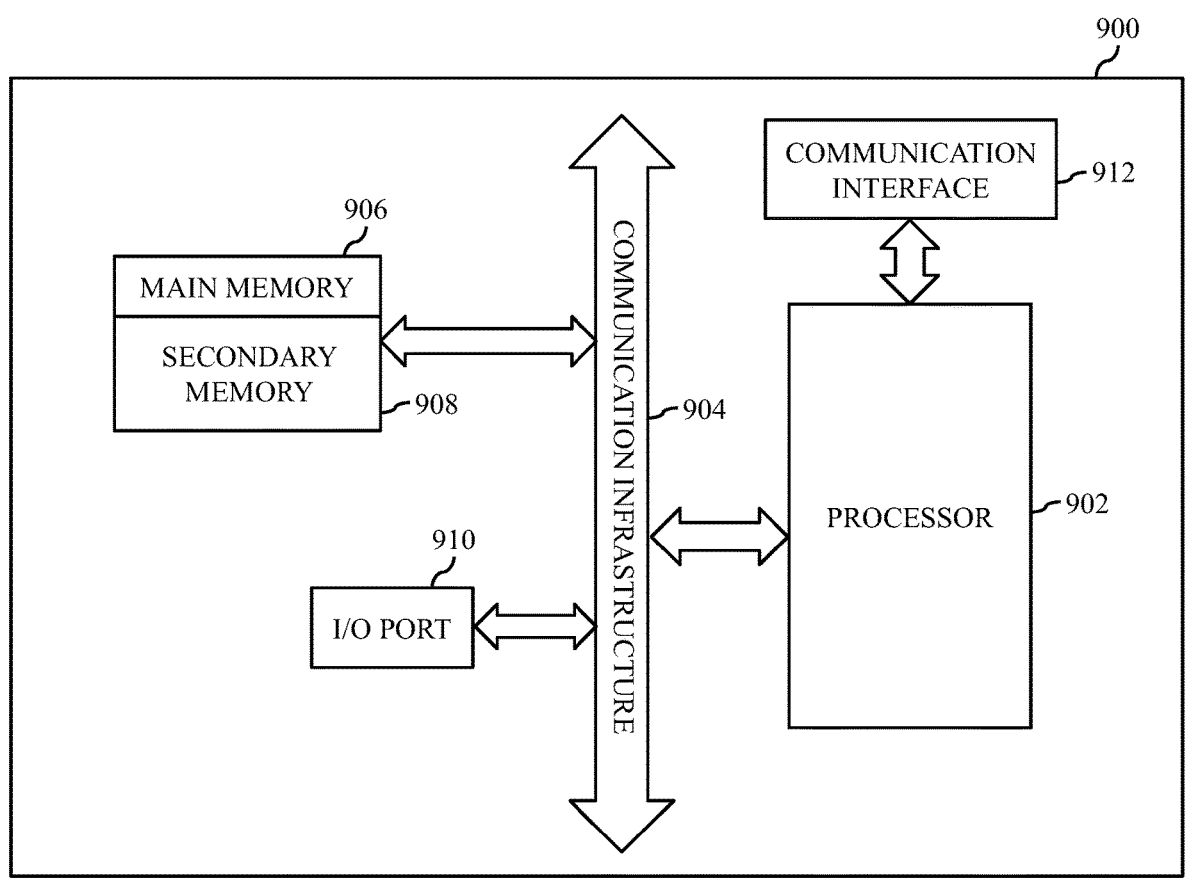
FIG. 9 is a block diagram that illustrates a system architecture of a computer system for providing the mobile ticketing services to one or more users, in accordance with an exemplary embodiment of the disclosure.

FIG. 9 is a block diagram that illustrates a system architecture of a computer system 900 for providing the mobile ticketing services to one or more users, in accordance with an exemplary embodiment of the disclosure. An embodiment of the disclosure, or portions thereof, may be implemented as computer readable code on the computer system 900. In one example, the application server 104 or the gate terminal 106 of FIG. 1 may be implemented in the computer system 900 using hardware, software, firmware, non-transitory computer readable media having instructions stored thereon, or any combination thereof and may be implemented in one or more computer systems or other processing systems. Hardware, software, or any combination thereof may embody modules and components used to implement the mobile ticketing method of FIGS. 5A-5C, 6A-6B, 7, and 8.

The computer system 900 may include a processor 902 that may be a special purpose or a general-purpose processing device. The processor 902 may be a single processor, multiple processors, or combinations thereof. The processor 902 may have one or more processor "cores." Further, the processor 902 may be coupled to a communication infrastructure 904, such as a bus, a bridge, a message queue, the communication network 108, multi-core message-passing scheme, and the like. The computer system 900 may further include a main memory 906 and a secondary memory 908. Examples of the main memory 906 may include RAM, ROM, and the like. The secondary memory 908 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media.

The computer system 900 may further include a I/O port 910 and a communication interface 912. The I/O port 910 may include various input and output devices that are configured to communicate with the processor 902. Examples of the input devices may include a keyboard, a mouse, a joystick, a touchscreen, a microphone, and the like. Examples of the output devices may include a display screen, a speaker, headphones, and the like. The communication interface 912 may be configured to allow data to be transferred between the computer system 900 and various devices that are communicatively coupled to the computer system 900. Examples of the communication interface 912 may include a modem, a network interface, i.e., an Ethernet card, a communications port, and the like. Data transferred via the communication interface 912 may be signals, such as electronic, electromagnetic, optical, or other signals as will be apparent to a person of ordinary skill in the art. The signals may travel via a communications channel, such as the communication network 108, which may be configured to transmit the signals to the various devices that are communicatively coupled to the computer system 900. Examples of the communication channel may include a wired, wireless, and/or optical medium such as cable, fiber optics, a phone line, a cellular phone link, a radio frequency link, and the like. The main memory 906 and the secondary memory 908 may refer to non-transitory computer readable mediums that may provide data that enables the computer system 900 to implement the mobile ticketing method of FIGS. 5A-5C, 6A-6B, 7, and 8.

Various embodiments of the disclosure provide the mobile ticketing method and system for providing mobile ticketing services to one or more users. In an embodiment, the application server 104 may be configured to receive the payment request from the user device 102 via the communication network 108 based on selection of the mobile ticket by the user. The application server 104 may be further configured to generate the encrypted QR data based on the successful processing of the payment request. The application server 104 may be further configured to transmit the encrypted QR data to the user device 102 via the communication network 108. In an embodiment, the user device 102 may be configured to decrypt the encrypted QR data received from the application server 104, and format the decrypted QR data to display as the QR code. The user device 102 may be further configured to initiate, via the BLE network 110, the scan for the gate terminal 106 associated with the entry or exit gate of a paid area based on the QR code. In an embodiment, the gate terminal 106 may be configured to scan the QR code from the user device 102, by using the QR scanner 406 associated with the gate terminal 106. The gate terminal 106 may be further configured to validate the scanned QR code to determine the successful validation or unsuccessful validation of the scanned QR code. The gate terminal 106 may be further configured to transmit, to the user device 102 via the BLE network 110, the encrypted data pertaining to the scanned QR code based on the validation of the scanned QR code. In an embodiment, the user device 102 may be configured to decrypt the encrypted data received from the gate terminal 106, and verify the decrypted data. The user device 102 may be further configured to transmit the connection request to the gate terminal 106 via the BLE network 110 based on the verification of the decrypted data. In an embodiment, the gate terminal 106 may be configured to validate the connection request received from the user device 102, based on the distance of the user device 102 from the gate terminal 106. The gate terminal 106 may be further configured to allow the user to pass through the entry or exit gate within the specified time period based on the successful validation of the scanned QR code, when the connection request has been successfully validated, or disallow the user to pass through the entry or exit gate based on the unsuccessful validation of the scanned QR code or the timeout of the specified time period.

Various embodiments of the disclosure provide a non-transitory computer readable medium having stored thereon, computer executable instructions, which when executed by a computer, cause the computer to execute operations for providing the mobile ticketing services to the one or more users. The operations include receiving, by the application server 104, the payment request from the user device 102 via the communication network 108. The payment request may be received based on selection of the mobile ticket by the user. The operations further include generating, by the application server 104, the encrypted QR data based on the successful processing of the payment request. The operations further include transmitting, by the application server 104, the encrypted QR data to the user device 102 via the communication network 108. The operations further include decrypting, by the user device 102, the encrypted QR data received from the application server 104, and formatting the decrypted QR data to display as the QR code. The operations further include initiating, by the user device 102 via the BLE network 110, the scan for the gate terminal 106 associated with an entry or exit gate of the paid area based on the QR code. The operations further include scanning, by the QR scanner 406 associated with the gate terminal 106, the QR code from the user device 102. The operations further include validating, by the gate terminal 106, the scanned QR code to determine the successful validation or an unsuccessful validation of the scanned QR code. The operations further include transmitting, by the gate terminal 106 to the user device 102 via the BLE network 110, the encrypted data pertaining to the scanned QR code based on the validation of the scanned QR code. The operations further include decrypting, by the user device 102, the encrypted data received from the gate terminal 106, and verifying the decrypted data. The operations further include transmitting, by the user device 102 via the BLE network 110, the connection request to the gate terminal 106 based on the verification of the decrypted data. The operations further include validating, by the gate terminal 106, the connection request received from the user device 102. The connection request may be validated based on the distance of the user device 102 from the gate terminal 106. The operations further include allowing, by the gate terminal 106, the user to pass through the entry or exit gate within the specified time period based on the successful validation of the scanned QR code, when the connection request has been successfully validated, or disallowing the user to pass through the entry or exit gate based on the unsuccessful validation of the scanned or the timeout of the specified time period.

The disclosed embodiments encompass numerous advantages. Exemplary advantages of the method and system include providing mobile ticketing services to one or more users. The mobile ticketing method and system may be implemented at any entry or exit points (for example, one or more entry or exit gates of an event, a metro station, a subway, a parking area, a vehicle, or the like) to control and manage the entry or exit of the one or more users in an effective and efficient manner. The mobile ticketing system uses the combination of one or more BLE devices (such as the BLE device 210 or 410) and one or more QR scanners (such as the QR scanner 406) to provide a closed loop and a secure way of transaction for both the user and the agency. Further, the mobile ticketing method uses offline verification of the QR code by the gate terminal 106. The complete process requires the application server 104 to generate the mobile ticket, post which the remaining transaction is handled between the user device 102 and the gate terminal 106, thereby providing a seamless, secure and fast experience along with ensuring zero fraud due to the tight integration between the one or more QR scanners (such as the QR scanner 406) and the one or more BLE devices (such as the BLE device 210 or 410). This results in reducing processing time and quick validation of the QR code, thereby improving the user experience.

Further, for efficient computation of the proximity of the user device 102 to the gate terminal 106, the mobile ticketing method and system facilitates the determination of the proximity based on the strength of the BLE network 110 between the user device 102 and the gate terminal 106. Further, to prevent avenues for fraud or misuse of the mobile ticket, the mobile ticketing method and system facilitates voiding of the QR code associated with the mobile ticket. For example, the user device 102 voids the QR code upon receiving the acknowledgement message from the gate terminal 106. Voiding of the QR code may prevent duplicate usage of the mobile ticket by other users.

Thus, the generation of the mobile ticket and voiding of the generated mobile ticket (after a predefine time interval or a predefined number of scans) may help in ensuring zero fraud or misuses of the mobile ticket, thereby preventing loss to both user and agency. Such efficient and effective method and system (for providing the mobile ticketing services to the one or more users) may assist one or more mobile ticket providers to optimize utilization of available resources, improve user comfort and safety, and thereby improve cost effectiveness of the mobile ticketing system by reducing infrastructure cost, thereby enhancing the efficiency.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, systems and methods for providing mobile ticketing services to one or more users in an online manner. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A mobile ticketing method, comprising:
   receiving, by a server, a payment request from a user device via a first communication network based on selection of a mobile ticket by a user;
   generating, by the server, encrypted quick response (QR) data based on successful processing of the payment request;
   transmitting, by the server, the encrypted QR data to the user device via the first communication network;
   decrypting, by the user device, the encrypted QR data received from the server, and formatting the decrypted QR data to display as a QR code;
   initiating, by the user device via a Bluetooth Low Energy (BLE) network, a scan for a gate terminal associated with an entry or exit gate of a paid area based on the QR code;
   scanning, by a QR scanner associated with the gate terminal, the QR code from the user device;
   validating, by the gate terminal, the scanned QR code to determine a successful validation or an unsuccessful validation of the scanned QR code;
   transmitting, by the gate terminal to the user device via the BLE network, encrypted data pertaining to the scanned QR code based on the validation of the scanned QR code;
   decrypting, by the user device, the encrypted data received from the gate terminal, and verifying the decrypted data;
   transmitting, by the user device via the BLE network, a connection request to the gate terminal based on the verification of the decrypted data;
   validating, by the gate terminal, the connection request received from the user device, based on a distance of the user device from the gate terminal; and
   allowing, by the gate terminal, the user to pass through the entry or exit gate within a specified time period based on the successful validation of the scanned QR code, when the connection request is successfully validated, or
   disallowing, by the gate terminal, the user to pass through the entry or exit gate based on the unsuccessful validation of the scanned QR code or a timeout of the specified time period.

2. The mobile ticketing method of claim 1, wherein the selection of the mobile ticket is performed by the user by using a mobile ticketing application running on the user device.

3. The mobile ticketing method of claim 1, wherein the scan for the gate terminal is automatically initiated based on opening of the QR code by the user on the user device.

4. The mobile ticketing method of claim 1, further comprising presenting, by the user device, a user interface to display ticket validity information associated with the mobile ticket based on the validation of the scanned QR code.

5. The mobile ticketing method of claim 4, wherein the ticket validity information includes at least validity information indicative of a positive outcome or one of negative outcomes, wherein the negative outcomes include at least one of over-travel or over-time information.

6. The mobile ticketing method of claim 1, further comprising transmitting, by the gate terminal to the user device via the BLE network, an acknowledgment message based on the successful validation of the scanned QR code, wherein the acknowledgment message is transmitted to void the QR code.

7. The mobile ticketing method of claim 1, further comprising generating, by the gate terminal, a first signal when the user is allowed to pass through the entry or exit gate, or a second signal when the user is disallowed to pass through the entry or exit gate, wherein
   the first signal is different from the second signal, and
   the first signal and the second signal are based on at least one of a color-based signal, an audio-based signal, or a text-based signal.

8. A user device for booking a mobile ticket for entering into a paid area, comprising:
circuitry configured to:
transmit, to a server via a first communication network, a payment request based on selection of the mobile ticket by a user;
receive, from the server via the first communication network, encrypted quick response (QR) data associated with the mobile ticket, wherein the encrypted QR data is received based on successful processing of the payment request by the server;
decrypt the encrypted QR data received from the server, and format the decrypted QR data to display as a QR code;
initiate, via a Bluetooth Low Energy (BLE) network, a scan for a gate terminal associated with an entry or exit gate of the paid area based on the QR code;
receive, from the gate terminal via the BLE network, encrypted data pertaining to the QR code based on validation of the QR code, wherein the gate terminal validates the QR code to determine a successful validation or an unsuccessful validation of the QR code;
decrypt the received encrypted data, and verify the decrypted data; and
transmit, to the gate terminal via the BLE network, a connection request based on the verification of the decrypted data, wherein the gate terminal validates the connection request and allows the user to pass through the entry or exit gate within a specified time period based on the successful validation of the QR code, when the connection request is successfully validated.

9. The user device of claim 8, wherein the selection of the mobile ticket is performed by the user by using a mobile ticketing application running on the user device.

10. The user device of claim 8, wherein the encrypted QR data is generated, by the server, based on the successful processing of the payment request.

11. The user device of claim 8, wherein the circuitry is further configured to initiate the scan for the gate terminal based on opening of the QR code by the user on the user device.

12. The user device of claim 8, wherein the circuitry is further configured to present a user interface to display ticket validity information associated with the mobile ticket based on the validation of the QR code by the gate terminal.

13. The user device of claim 12, wherein the ticket validity information includes at least validity information indicative of a positive outcome or one of negative outcomes, wherein the negative outcomes include at least one of over-travel or over-time information.

14. The user device of claim 8, wherein the circuitry is further configured to receive an acknowledgment message from the gate terminal via the BLE network, wherein the acknowledgment message is received based on the successful validation of the QR code by the gate terminal, and wherein the acknowledgment message is used to void the QR code.

15. A gate terminal for providing restricted entry into a paid area, comprising:
circuitry configured to:
scan a quick response (QR) code from a user device;
validate the scanned QR code to determine a successful validation or an unsuccessful validation of the scanned QR code;
transmit, to the user device via a Bluetooth Low Energy (BLE) network, encrypted data pertaining to the scanned QR code based on the validation of the scanned QR code;
receive, via the BLE network, a connection request from the user device, wherein the connection request is received based on verification of the encrypted data by the user device;
validate the received connection request based on a distance of the user device from the gate terminal; and
allow a user to pass through an entry or exit gate within a specified time period based on the successful validation of the scanned QR code, when the connection request is successfully validated, or
disallow the user to pass through the entry or exit gate based on the unsuccessful validation of the scanned QR code or a timeout of the specified time period.

16. The gate terminal of claim 15, wherein, prior to the scan of the QR code, encrypted QR data is generated by a server and transmitted to the user device via a first communication network, wherein the encrypted QR data is generated based on successful processing of a payment request corresponding to selection of a mobile ticket by the user, wherein the received encrypted QR data is decrypted and formatted by the user device to display the QR code for the scan, and wherein the selection of the mobile ticket is performed by using a mobile ticketing application running on the user device.

17. The gate terminal of claim 15, wherein a user interface is presented on the user device to display ticket validity information associated with the mobile ticket based on the validation of the scanned QR code.

18. The gate terminal of claim 17, wherein the ticket validity information includes at least validity information indicative of a positive outcome or one of negative outcomes, wherein the negative outcomes include at least one of over-travel or over-time information.

19. The gate terminal of claim 15, wherein the circuitry is further configured to transmit an acknowledgment message to the user device based on the successful validation of the QR code, wherein the acknowledgment message is transmitted to void the QR code.

20. The gate terminal of claim 15, wherein the circuitry is further configured to generate a first signal when the user is allowed to pass through the entry or exit gate, or a second signal when the user is disallowed to pass through the entry or exit gate, wherein
the first signal is different from the second signal, and
the first signal and the second signal are based on at least one of a color-based signal, an audio-based signal, or a text-based signal.

* * * * *